US011225090B2

(12) United States Patent
Osawa et al.

(10) Patent No.: US 11,225,090 B2
(45) Date of Patent: Jan. 18, 2022

(54) ULTRASONIC SENSOR AND ELECTRONIC APPARATUS

(71) Applicant: Seiko Epson Corporation, Tokyo (JP)

(72) Inventors: Eiji Osawa, Chino (JP); Daisuke Honda, Munakata (JP)

(73) Assignee: Seiko Epson Corporation

( * ) Notice: Subject to any disclaimer, the term of this patent is extended or adjusted under 35 U.S.C. 154(b) by 419 days.

(21) Appl. No.: 16/414,107

(22) Filed: May 16, 2019

(65) Prior Publication Data

US 2019/0353480 A1 Nov. 21, 2019

(30) Foreign Application Priority Data

May 17, 2018 (JP) .............................. JP2018-095360

(51) Int. Cl.
*G01N 29/27* (2006.01)
*G01N 29/22* (2006.01)
*G01N 29/26* (2006.01)
*B41J 11/00* (2006.01)
*G01B 15/02* (2006.01)

(52) U.S. Cl.
CPC .......... *B41J 11/006* (2013.01); *G01N 29/221* (2013.01); *G01N 29/262* (2013.01); *G01N 29/27* (2013.01); *G01B 15/02* (2013.01); *G01N 2291/048* (2013.01); *G01N 2291/106* (2013.01)

(58) Field of Classification Search
CPC .... B65H 7/125; B65H 2553/30; G01B 15/02; B41J 11/006
USPC .......................................................... 73/632
See application file for complete search history.

(56) References Cited

U.S. PATENT DOCUMENTS

| | | | | | |
|---|---|---|---|---|---|
| 5,971,388 | A | * | 10/1999 | Hattori ..................... | B65H 5/06 |
| | | | | | 271/10.03 |
| 6,520,498 | B2 | * | 2/2003 | Phinney ................... | B65H 7/06 |
| | | | | | 271/258.01 |
| 8,585,050 | B2 | * | 11/2013 | Syracuse ................ | B65H 7/125 |
| | | | | | 271/258.01 |
| 9,745,160 | B2 | * | 8/2017 | Hongo .................. | B65H 5/062 |

(Continued)

FOREIGN PATENT DOCUMENTS

| | | |
|---|---|---|
| JP | H06-072591 A | 3/1994 |
| JP | 4812114 B2 | 11/2011 |

(Continued)

*Primary Examiner* — Jacques M Saint Surin
(74) *Attorney, Agent, or Firm* — Harness, Dickey & Pierce, P.L.C.

(57) ABSTRACT

An ultrasonic sensor includes a first base facing a conveying surface, a transmission section on a first axis tilted relative to the conveying surface and at a far side of the first base for transmitting an ultrasonic wave toward the first axis, and a reception section on the first axis and at a far side of the conveying surface for receiving the ultrasonic wave. The transmission section has a plurality of transmission elements for transmitting the ultrasonic wave arranged to cross the first axis. The first base has a first aperture through which the ultrasonic wave transmitted from the transmission section along the first axis passes. An area of the first aperture is smaller than an area of an ultrasonic wave transmission surface of the transmission section. The transmission section delays driving the transmission elements to converge the ultrasonic wave transmitted from the transmission section toward the first aperture.

7 Claims, 12 Drawing Sheets

(56) References Cited

U.S. PATENT DOCUMENTS

| | | | |
|---|---|---|---|
| 10,486,929 B2 * | 11/2019 | Link | .................. H04N 1/00705 |
| 2008/0203654 A1 | 8/2008 | Chujo et al. | |
| 2014/0091516 A1 | 4/2014 | Okitsu | |

FOREIGN PATENT DOCUMENTS

| | | |
|---|---|---|
| JP | 5770848 B2 | 8/2015 |
| JP | 2017-088269 A | 5/2017 |

* cited by examiner

ULTRASONIC SENSOR AND ELECTRONIC APPARATUS

The present application is based on and claims priority from JP Application Serial Number 2018-095360, filed May 17, 2018, the disclosure of which is hereby incorporated by reference herein in its entirety.

BACKGROUND

1. Technical Field

The present disclosure relates to an ultrasonic sensor and an electronic apparatus.

2. Related Art

In the past, there has been known a device for detecting the state of an object using an ultrasonic wave (see, e.g., JP-A-2017-88269 (Document 1)).

The device described in Document 1 is a form conveying device for conveying a form (an object) one by one from a tray. In this form conveying device, there is provided an overlap feed sensor for detecting whether or not two or more forms are conveyed. The overlap feed sensor is provided with a transmission section for transmitting an ultrasonic wave so as to pass through the form, and a reception section for receiving the ultrasonic wave having passed through the form. In such an overlap feed sensor, the ultrasonic wave is transmitted from the transmission section, and the ultrasonic wave is received by the reception section. On this occasion, since the received signal drops in the case in which two or more forms conveyed overlap each other, it is possible to detect the overlap feed of the forms.

Incidentally, in the case of providing a conveying device for conveying the form with the overlap feed sensor for detecting the overlap feed, there is provided a base for guiding the conveyance of the form along a conveying path (a conveying surface) of the form, and the base is provided with a hole section through which the ultrasonic wave transmitted from the overlap feed sensor passes. However, the form conveyed is caught by the hole section in some cases, and if the conveying operation is continued while the form is caught by the hole section, the form wrinkles or the form jams in the device.

SUMMARY

An advantage of some aspects of the invention is to provide an ultrasonic sensor and an electronic apparatus capable of preventing an object from wrinkling or jamming.

An ultrasonic sensor according to an application example of the present disclosure includes a first base opposed to a conveying surface on which an object is conveyed, a transmission section disposed on a first axis tilted with respect to the conveying surface, and at a side opposite to the first base to the conveying surface, and configured to transmit an ultrasonic wave toward the first axis, and a reception section disposed on the first axis, and at a side opposite to the conveying surface to the transmission section, and configured to receive the ultrasonic wave, the transmission section is provided with a plurality of transmission elements each configured to transmit the ultrasonic wave arranged along a direction crossing the first axis, the first base is provided with a first aperture part through which the ultrasonic wave transmitted from the transmission section along the first axis passes, an aperture area of the first aperture part being smaller than an area of a transmission surface configured to transmit the ultrasonic wave of the transmission section, and the transmission section performs delayed drive on the plurality of transmission elements to thereby converge the ultrasonic wave transmitted from the transmission section toward the first aperture part.

In the present application example, the ultrasonic sensor is provided with the transmission section and the reception section disposed on the first axis crossing the conveying surface and across the conveying surface from each other, and between the transmission section and the conveying surface, there is disposed the first base. The first base has the first aperture part along the first axis, and the ultrasonic wave transmitted from the transmission section is output to the object on the conveying surface through the first aperture part. In such an ultrasonic sensor, by receiving the ultrasonic wave transmitted through the object with the reception section, it becomes possible to detect the state (e.g., the thickness of the object and the overlap feed of the object) of the object based on the signal intensity of the reception signal output from the reception section.

Further, in the present application example, the aperture area of the first aperture part provided to the first base is smaller than the transmission surface of the transmission section, and the transmission section performs the delayed drive on the plurality of transmission elements arranged in the direction crossing the first axis to thereby converge the transmitted ultrasonic wave toward the first aperture part (beam focusing). Therefore, it is possible to make the aperture area of the first aperture part small, and in the case of conveying the object along the conveying surface, the inconvenience that the object is caught by the first aperture part can be suppressed, and thus, the wrinkle and jam of the object can be suppressed.

Further, since the ultrasonic wave transmitted from the transmission section is converged on the first aperture part due to the beam focusing, it is possible to suppress the amount of transmitted ultrasonic wave reflected by the first base, and it is possible to transmit the ultrasonic wave high in sound pressure to the object. In other words, in the present application example, it is possible to suppress the wrinkle and jam of the object while suppressing the degradation of the transmission/reception accuracy of the ultrasonic wave in the ultrasonic sensor.

In the ultrasonic sensor according to the present application example, the transmission section may converge the ultrasonic wave on a center of the first aperture part as a focal point. It should be noted that the center of the first aperture part described here corresponds to the centroid of the first aperture part in the plan view when viewed from the first axis. Further, in the present disclosure, the case in which the focal point is slightly shifted from the centroid is also included besides the case in which the focal point completely coincides with the centroid. In other words, the error in a range in which the transmission/reception accuracy of the ultrasonic wave in the ultrasonic sensor is not affected is included in the present disclosure.

In the present application example, since the transmission section performs the beam focusing on the center of the first aperture part as the focal point, the beam width of the ultrasonic wave transmitted from the transmission section becomes a minimum width the first aperture part. Therefore, by setting the aperture area of the first aperture part to the dimension corresponding to the beam width, it is possible to minimize the aperture area of the first aperture part while keeping the sound pressure of the transmitted ultrasonic wave output toward the object in a high level.

In the ultrasonic sensor according to the present application example, the conveying surface may be located within a focal depth of a beam of the ultrasonic wave transmitted from the transmission section.

In the case of performing the delayed drive on each of the transmission elements of the transmission section to converge the transmitted ultrasonic wave on a predetermined focal point, the transmitted ultrasonic wave is provided with the beam shape in which the beam width gradually decreases from the transmission section toward the focal point, roughly the same beam width is kept from the focal point to a predetermined focal depth of the beam, and then the beam width gradually increases after exceeding the focal depth of the beam. In the present application example, since the conveying surface is located within the focal depth of the beam, the ultrasonic beam converged by the beam focusing into roughly the minimum beam width can be input to the object. In the area in the focal depth of the beam from the focal point, the ultrasonic waves transmitted from the respective transmission elements are combined to reinforce each other, and therefore, the sound pressure of the ultrasonic wave also rises. Therefore, by disposing the conveying surface in this zone, the sound pressure of the ultrasonic wave transmitted through the object also rises, and thus, the reception signal high in signal intensity is output from the reception section having received the transmitted ultrasonic wave. Thus, it becomes possible to perform the accurate state detection of the object with the noise suppressed based on the reception signal in the ultrasonic sensor.

In the ultrasonic sensor according to the present application example, there may further be included a second base disposed between the reception section and the conveying surface, and opposed to the conveying surface, and the second base may be provided with a second aperture part through which the ultrasonic wave transmitted through the object along the first axis passes, an aperture area of the second aperture part being smaller than an area of a reception surface configured to receive the ultrasonic wave of the reception section.

When the ultrasonic wave on which the beam focusing has been performed is input to the object, the ultrasonic wave corresponding to the state (the thickness) of the object is transmitted through the object. On this occasion, the ultrasonic wave having been transmitted through the object proceeds toward the reception section with a beam shape in which the beam width spreads as the ultrasonic wave gets away from the input position of the ultrasonic wave. Therefore, even in the case in which the aperture area of the second aperture part is small with respect to the reception surface of the reception section, it is possible to make the ultrasonic wave having been transmitted through the object pass therethrough toward the reception section. Further, since it is possible to make the aperture area of the second aperture part small, it is possible to suppress the catch of the object by the second aperture part to suppress the wrinkle and jam of the object.

In the ultrasonic sensor according to the present application example, the aperture area of the second aperture part may be larger than the aperture area of the first aperture part.

As described above, the beam width of the ultrasonic wave transmitted through the object spreads as the ultrasonic wave gets away from the input position of the ultrasonic wave. Therefore, if the second aperture part is made smaller in aperture area than the first aperture part, a part of the ultrasonic wave having been transmitted through the object fails to be received by the reception section through the second aperture part, but is reflected by the second base. In contrast, in the present application example, since the second aperture part is larger in aperture area than the first aperture part, the reflection of the ultrasonic wave by the second base can be suppressed.

In the ultrasonic sensor according to the present application example, the conveying surface may be a surface of the second base, the surface being opposed to the first base.

In the present application example, the conveying surface is the surface of the second base, the surface being opposed to the first base. In other words, the object is conveyed along the surface of the second base. In this case, the ultrasonic wave having been transmitted through the object on the conveying surface is received by the reception section through the second aperture part contiguous to the conveying surface as a result, and thus, it is possible to minimize the aperture area of the second aperture part to more preferably suppress the wrinkle and jam of the object.

An electronic apparatus according to an application example of the present disclosure includes the ultrasonic sensor according to the application example described above, and a state detection section configured to detect a state of the object in accordance with an output from the reception section of the ultrasonic sensor.

In the present application example, as described above, in the ultrasonic sensor, the reception signal output from the reception section can be increased in intensity while suppressing the inconvenience that the object is caught by the first aperture part. Therefore, it is possible to detect the state of the object with high accuracy based on the reception signal from the reception section.

DESCRIPTION OF EXEMPLARY EMBODIMENTS

First Embodiment

A first embodiment according to the present disclosure will hereinafter be described.

Figure 1:
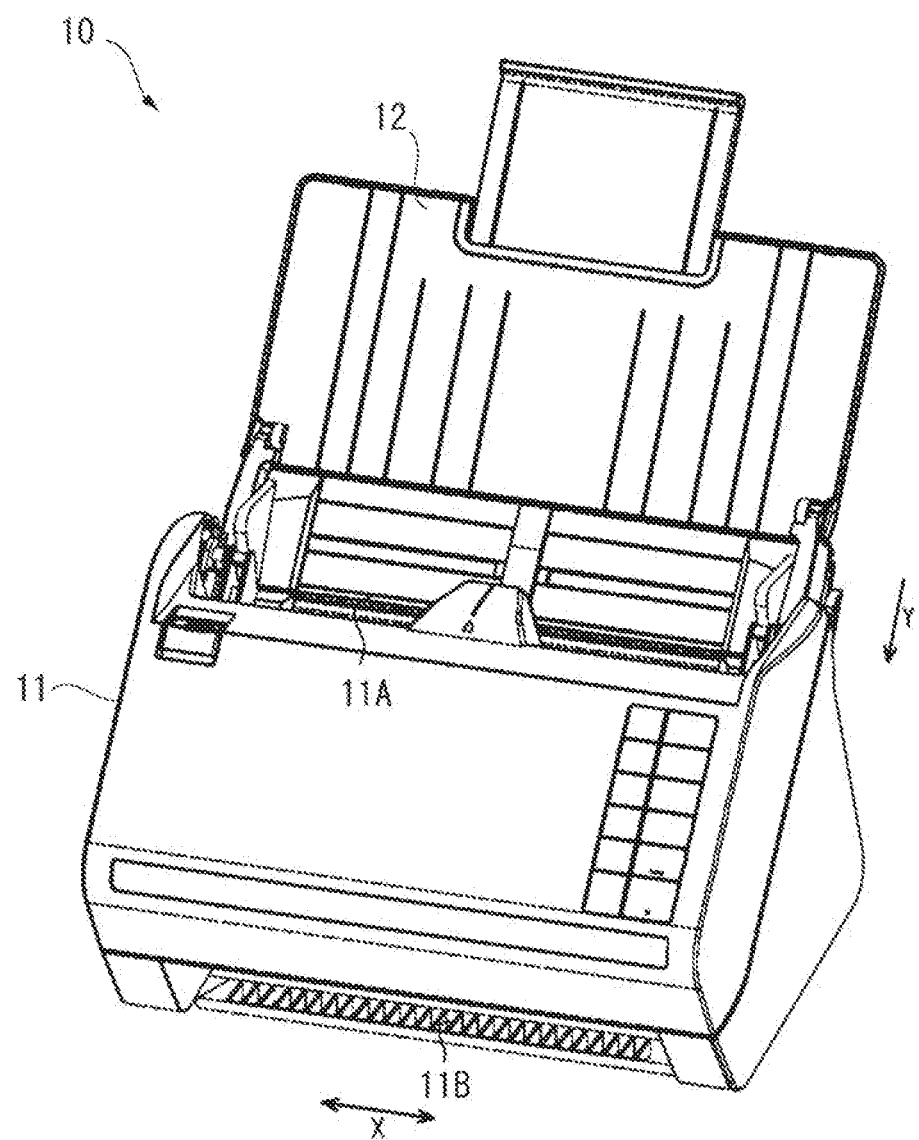
FIG. 1 is an external view showing a schematic configuration of an image scanner according to a first embodiment.
Figure 2:
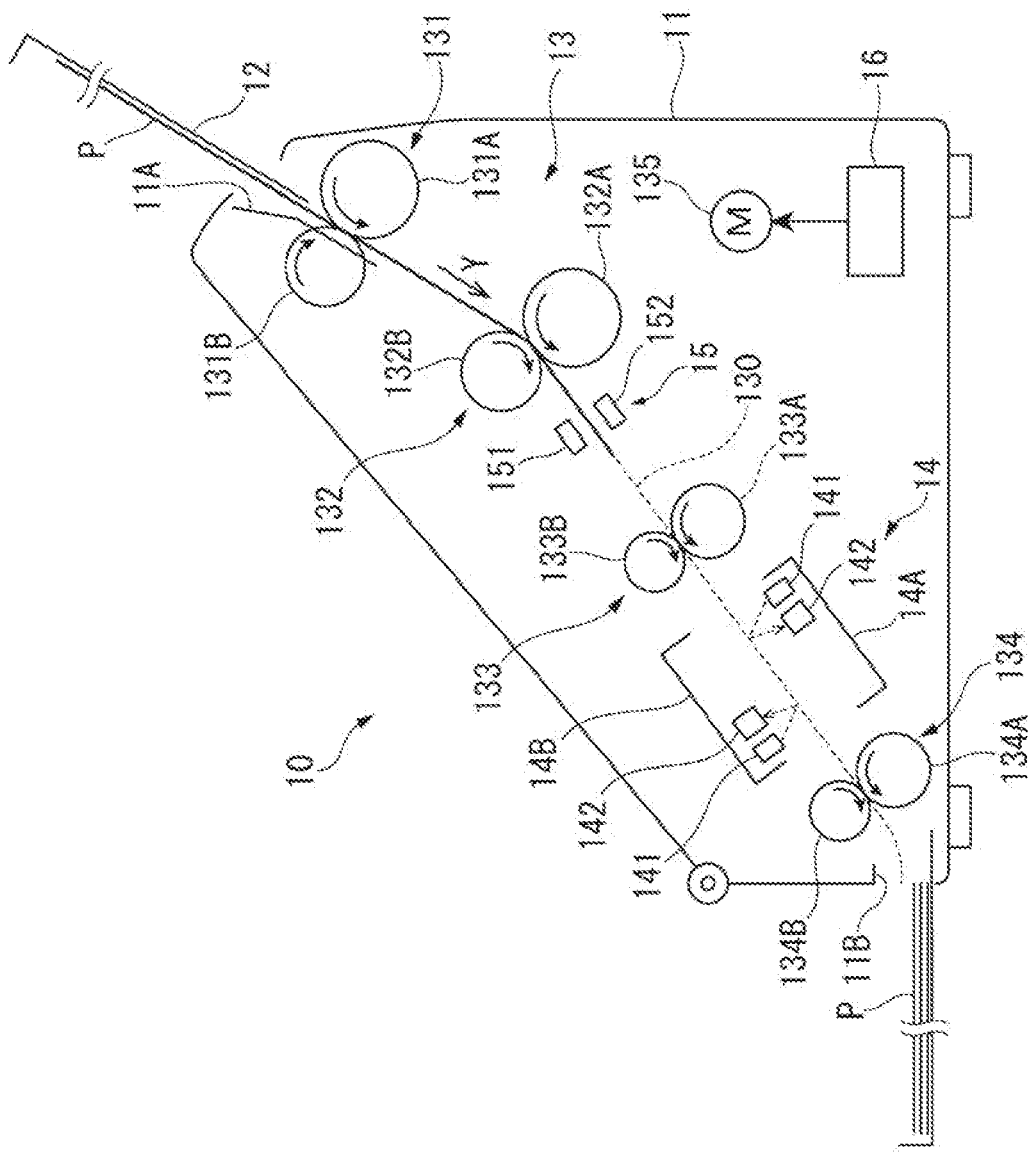
FIG. 2 is a side cross-sectional view showing an outline of a conveying section of the first embodiment.

FIG. 1 is an external view showing a schematic configuration of an image scanner 10 according to the present embodiment. FIG. 2 is a side cross-sectional view showing an outline of a conveying section of the image scanner 10. It should be noted that FIG. 2 is a side cross-sectional view in the case of viewing the image scanner 10 from the X direction perpendicular to the conveying direction (a Y direction).

Schematic Configuration of Image Scanner 10

As shown in FIG. 1, the image scanner 10 according to the present embodiment is provided with a device main body (hereinafter abbreviated as a main body 11), and a form support 12 on which a form P (see FIG. 2) as an object is mounted. Inside the main body 11, there are disposed the conveying section 13 for conveying the form P, a scanning section 14 for reading an image of the form P thus conveyed, an ultrasonic sensor 15 (an overlap feed sensor) for detecting the overlap feed of the form P, and a control section 16 for controlling the image scanner 10 as shown in FIG. 2. It should be noted that in the present embodiment, the form P is illustrated as the object, but this is not a limitation, and it is possible to cite a variety of media such as a film and cloth as the object.

The main body 11 is provided with a feed port 11A at a coupling position to the form support 12 as shown in FIG. 1 and FIG. 2. The form P mounted on the form support 12 is fed to the feed port 11A one by one. The form P thus fed is conveyed by the conveying section 13 along a predetermined conveying path (a conveying surface 130) inside the main body 11. Then, the image thereof is read by a scanning section 14 at a reading position on the conveyance, and then the form P is discharged from a discharge port 11B opening in a lower front part of the main body 11.

Configuration of Conveying Section 13

The conveying section 13 conveys a plurality of forms P mounted (set) on the form support 12 in the conveying direction (the Y direction) one by one. Specifically, the conveying section 13 feeds the form P which has been fed from the feed port 11A, while guiding the form P to the inside of the main body 11, and then conveys the form P thus fed along the conveying surface 130.

More specifically, the conveying section 13 is provided with a first feed roller pair 131 disposed on an upstream in the conveying direction (the Y direction) of the form P inside the main body 11, and a second feed roller pair 132 disposed on a downstream in the Y direction of the first feed roller pair 131. Further, the conveying section is provided with a first conveying roller pair 133 disposed on the upstream and a second conveying roller pair 134 disposed on the downstream respectively on both sides in the Y direction of the reading position of the form P.

The first feed roller pair 131 is constituted by a first drive roller 131A and a first driven roller 131B. Similarly, the second feed roller pair 132 is constituted by a second drive roller 132A and a second driven roller 132B. Further, the first conveying roller pair 133 is constituted by a third drive roller 133A and a third driven roller 133B. Similarly, the second conveying roller pair 134 is constituted by a fourth drive roller 134A and a fourth driven roller 134B. Each of the driven rollers 131B through 134B is driven in accordance (performs linkage rotation) with the rotation of one of the drive rollers 131A through 134A with which the driven roller makes a pair.

The drive rollers 131A through 134A respectively constituting the roller pairs 131 through 134 are rotationally driven due to the power of a conveying motor 135 as a power source thereof. It should be noted that the conveying motor 135 is controlled by the control section 16 to drive each of the drive rollers 131A through 134A.

Further, the second driven roller 132B constituting the second feed roller pair 132 is made as a retard roller, and the friction coefficient of an outer circumferential surface thereof to the form P is made higher than the friction coefficient of an outer circumferential surface of the second drive roller 132A to the form P. Therefore, the second feed roller pair 132 functions as a separation mechanism for separating the form P one by one, and then feeding the form P toward the downstream in the Y direction. Therefore, the plurality of forms P mounted on the form support 12 is fed one by one in sequence from, for example, the lowermost one from the feed port 11A to the inside of the main body 11 due to the rotation of the first feed roller pair 131, and is further fed toward the downstream in the Y direction after being separated one by one due to the rotation of the second feed roller pair 132.

Configuration of Scanning Section 14

As shown in FIG. 2, between the first conveying roller pair 133 and the second conveying roller pair 134 on the conveying surface 130, there is disposed the reading position at which the image of the form P is read, and there is disposed the scanning section 14.

The scanning section 14 is constituted by, for example, a first scanning section 14A and a second scanning section 14B disposed on both sides across the conveying surface 130 from each other. The scanning section 14 is constituted by light sources 141 each capable of irradiating the form P with light while conveying the form P, and image sensors 142 each extending in a main scanning direction (the X direction crossing the Y direction as the conveying direction). The first scanning section 14A performs the reading operation in a normal reading mode for reading one surface (an obverse side) of the form P, and both of the first scanning section 14A and the second scanning section 14B perform the reading operation in a both-side reading mode for reading the both surfaces (obverse and reverse sides) of the form P. The light sources 141 and the image sensors 142 constituting the scanning section 14 (14A, 14B) are connected to the control section 16, and perform a scanning process for reading the image of the form P due to the control by the control section 16.

Configuration of Ultrasonic Sensor 15

The ultrasonic sensor 15 is disposed at a position between, for example, the second feed roller pair 132 and the first conveying roller pair 133 in the Y direction. The ultrasonic sensor 15 is an overlap feed sensor, and detects overlap feed of the form P conveyed by the conveying section 13.

Figure 3:
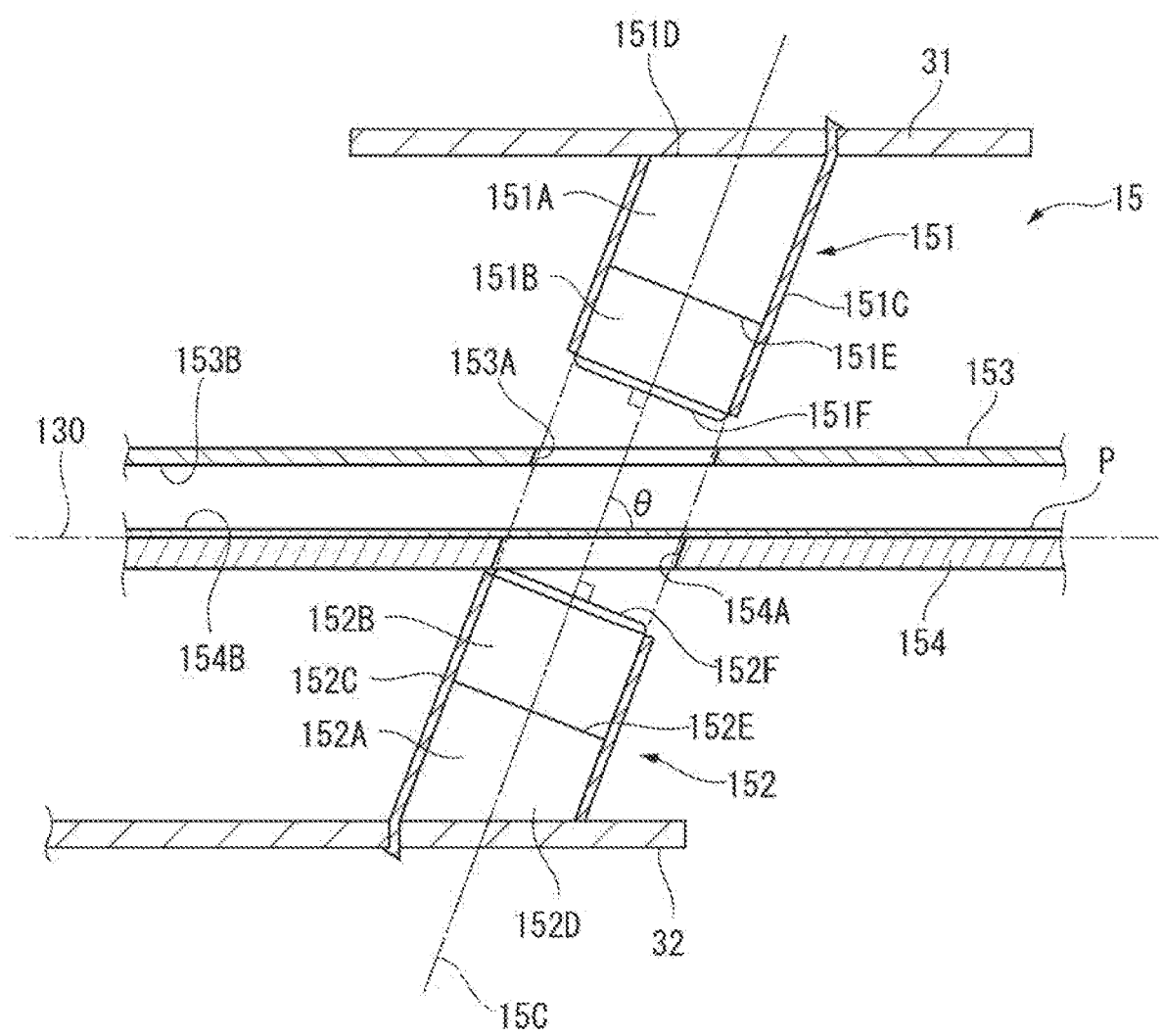
FIG. 3 is a cross-sectional view showing a schematic configuration of an ultrasonic sensor according to the first embodiment.

FIG. 3 is a cross-sectional view showing a schematic configuration of the ultrasonic sensor 15. It should be noted that FIG. 3 shows a cross-sectional view of the ultrasonic sensor 15 viewed from the conveying direction (the Y direction).

As shown in FIG. 3, the ultrasonic sensor 15 is configured including a transmission section 151, a reception section 152, a first base 153 and a second base 154.

The transmission section 151 and the reception section 152 are disposed across the conveying surface 130 from each other. The first base 153 is located between the transmission section 151 and the conveying surface 130, and the second base 154 is located between the reception section 152 and the conveying surface 130.

In the ultrasonic sensor 15, an ultrasonic wave is transmitted from the transmission section 151 to the form P conveyed by the conveying section 13. The ultrasonic wave transmitted from the transmission section 151 passes through a first aperture part 153A provided to the first base 153, and is then input to the form P. The ultrasonic wave transmitted through the form P passes through a second aperture part 154A of the second base 154, and is then received by the reception section 152. When the ultrasonic wave is received by the reception section 152, a reception signal corresponding to sound pressure of the ultrasonic wave thus received is output from the reception section 152, and the overlap feed of the form P is detected based on the signal intensity of the reception signal.

As shown in FIG. 3, the transmission section 151 and the reception section 152 are attached to the main body 11 so that a sensor central axis 15C (a first axis) passing through the center of the transmission section 151 and the center of the reception section 152 is tilted at a predetermined angle θ (e.g., 20°) with respect to a normal line of the surface of the form P conveyed on the conveying surface 130.

Therefore, in the case in which the sensor central axis 15C coincides with the normal direction of the surface of the form P, there is a possibility that the ultrasonic wave transmitted from the transmission section 151 is multiply reflected between the form P and the transmission section 151. Further, there is a possibility that the ultrasonic wave having passed through the form P is multiply reflected between the reception section 152 and the form P. In this case, in the reception section 152, an accurate overlap feed cannot be achieved since the reception section 152 receives the ultrasonic wave due to the multiple reflection in addition to the ultrasonic wave (the ultrasonic wave as the measurement object) which passes from the transmission section 151 through the form P and is received by the reception section 152.

In contrast, by tilting the sensor central axis 15C with respect to the normal line of the surface of the form P, it becomes possible to reduce the reception in the reception section 152 of the unwanted ultrasonic component such as a multiply reflected ultrasonic wave, and thus, the overlap feed high in accuracy becomes possible.

Configuration of First Base 153 and Second Base 154

The first base 153 and the second base 154 respectively have guide surfaces 153B, 154B opposed to the conveying surface 130 to guide the form P. In the present embodiment, the second guide surface 154B of the second base 154 on the side on which the reception section 152 is disposed coincides (or roughly coincides) with the conveying surface 130. In other words, in the present embodiment, the form P is conveyed along the second guide surface 154B of the second base 154.

Further, the first base 153 is provided with the first aperture part 153A which penetrates along the sensor central axis 15C, and through which the ultrasonic wave transmitted from the transmission section 151 passes.

Similarly, the second base 154 is provided with the second aperture part 154A which penetrates along the sensor central axis 15C, and through which the ultrasonic wave transmitted through the form P passes. It should be noted that the detailed explanation regarding the aperture area and the aperture width of the first aperture part 153A and the second aperture part 154A will be described later.

Configuration of Transmission Section 151

The transmission section 151 is provided with a transmission seating section 151A, a transmission main body part 151B and a transmission-side shield 151C, and is fixed to a transmission circuit board 31. The transmission circuit board 31 is fixed so as to be parallel to, for example, the conveying surface 130 inside the main body 11.

In the transmission seating section 151A, a base end-side end surface 151D is fixed to the transmission circuit board 31, and a tip-side end surface 151E on the opposite side to the base end-side end surface 151D is tilted at the angle θ with respect to the base end-side end surface 151D. Further, by the transmission main body part 151B being fixed to the tip-side end surface 151E, a transmission surface 151F for the ultrasonic wave of the transmission section 151 is fixed at an angle so as to be perpendicular to the sensor central axis 15C.

The transmission-side shield 151C is, for example, a cylindrical member made of metal, and the transmission seating section 151A and the transmission main body part 151B are inserted and housed inside the transmission-side shield 151C. The transmission-side shield 151C suppresses static electricity and an electromagnetic-wave noise. Further, one end of the transmission-side shield 151C is fixed to the transmission circuit board 31. Thus, the transmission main body part 151B is fixed to the transmission circuit board 31 so that the transmission surface 151F is perpendicular to the sensor central axis 15C.

The reception section 152 has roughly the same configuration as that of the transmission section 151. Specifically, the reception section 152 is provided with a reception seating section 152A, a reception main body part 152B and a reception-side shield 152C, and is fixed to a reception circuit board 32. The reception circuit board 32 is fixed in parallel to, for example, the conveying surface 130 inside the main body 11.

In the reception seating section 152A, a base end-side end surface 152D is fixed to the reception circuit board 32, and a tip-side end surface 152E on the opposite side to the base end-side end surface 152D is tilted at the angle θ with respect to the base end-side end surface 152D. Further, by the reception main body part 152B being fixed to the tip-side end surface 152E, a reception surface 152F for the ultrasonic wave of the reception section 152 is fixed at an angle so as to be perpendicular to the sensor central axis 15C.

The reception-side shield 152C is, for example, a cylindrical member made of metal, and the reception seating section 152A and the reception main body part 152B are housed inside. Similarly to the transmission-side shield 151C, the reception-side shield 152C suppresses static electricity and an electromagnetic-wave noise. Further, one end of the reception-side shield 152C is fixed to the reception circuit board 32, and thus, the reception main body part 152B is fixed to the reception circuit board 32 so that the reception surface 152F is perpendicular to the sensor central axis 15C.

It should be noted that although in the present embodiment, there is shown an example in which the transmission circuit board 31 and the reception circuit board 32 are disposed independently of each other, this is not a limitation, and it is also possible to adopt a configuration in which the transmission circuit board 31 and the reception circuit board 32 are integrally disposed in a single board. Further, it is also possible to constitute at least either one of the transmission circuit board 31 and the reception circuit board 32 by a plurality of boards.

Element Configuration of Transmission Section 151

Then, the transmission main body part 151B constituting the transmission section 151 will more specifically be described.

Figure 4:
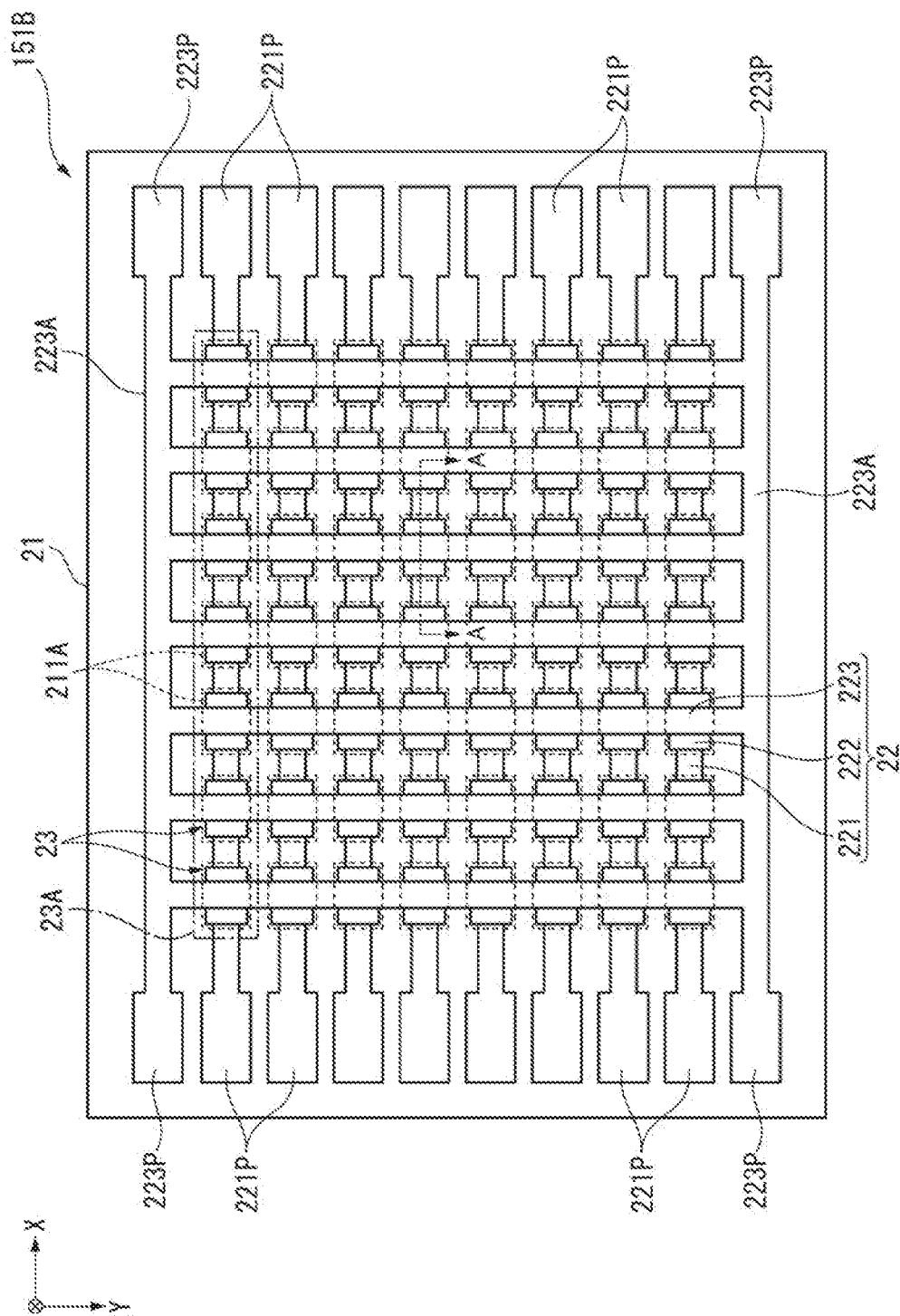
FIG. 4 is a plan view of a transmission main body part constituting the ultrasonic sensor according to the first embodiment.
Figure 5:
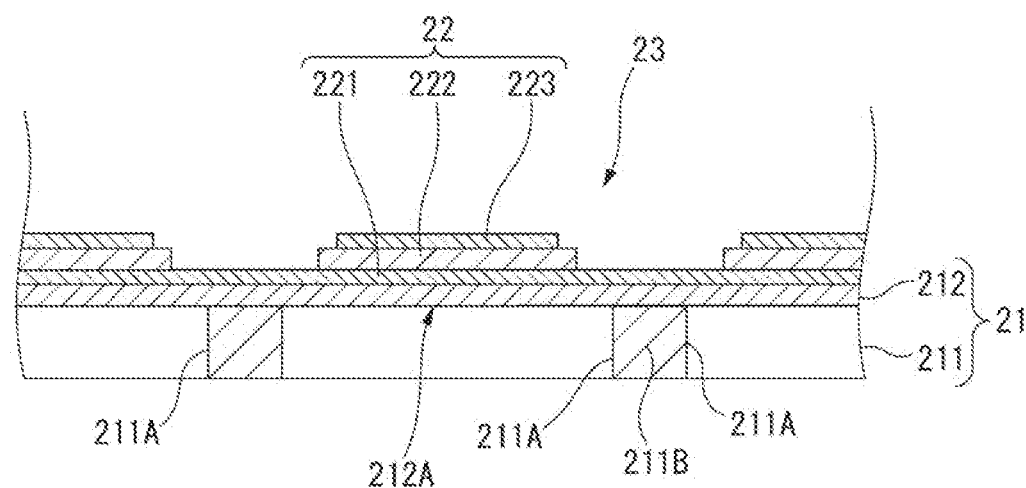
FIG. 5 is a cross-sectional view of a part of the transmission main body part cut along the line A-A shown in FIG. 4.
Figure 5:
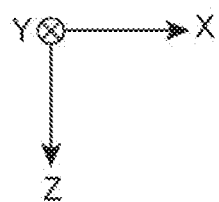

FIG. 4 is a plan view showing a schematic configuration of the transmission main body part 151B. FIG. 5 is a cross-sectional view of a part of the transmission main body 151B.

As shown in FIG. 4 and FIG. 5, the transmission main body part 151B is configured including an element substrate 21 and piezoelectric elements 22. In the present embodiment, the substrate thickness direction (a Z direction) of the element substrate 21 coincides (or roughly coincides) with the sensor central axis 15C, and the X direction crossing the Z direction coincides (or roughly coincides) with the main scanning direction of the image scanner 10, and the Y direction crossing both of the Z direction and the X direction corresponds to the conveying direction. Further, the Z direction (the direction toward the +Z side) becomes the direction (the direction toward the form P) in which the ultrasonic wave is transmitted.

Configuration of Element Substrate 21

As shown in FIG. 5, the element substrate 21 is provided with a substrate main body part 211, and a vibrating film 212 disposed on the −Z side of the substrate main body part 211.

The substrate main body part 211 is a substrate for supporting the vibrating film 212, and is formed of a semiconductor substrate made of, for example, Si. Here, the element substrate 21 is provided with a plurality of aperture parts 211A disposed in a two-dimensional array along the X direction and the Y direction as shown in FIG. 4 in a plan view viewed from the Z direction.

In the present embodiment, each of the aperture parts 211A is a through hole penetrating the substrate main body part 211 in the substrate thickness direction (the Z direction) thereof, and the vibrating film 212 is disposed so as to close one end side (the −Z side) of the through hole.

The vibrating film 212 is formed of, for example, $SiO_2$ or a stacked body of $SiO_2$ and $ZrO_2$, and is disposed on the −Z side of the substrate main body part 211. The thickness of the vibrating film 212 is made sufficiently small with respect to that of the substrate main body part 211. The vibrating film 212 is supported by wall parts 211B (see FIG. 5) of the substrate main body part 211 constituting the aperture part 211A, and closes the −Z side of the aperture part 211A. In the vibrating film 212, a part (an area closing the aperture part 211A) overlapping the aperture part 211A in the plan view constitutes a vibrating part 212A. In other words, the aperture part 211A defines the outer edge of the vibrating part 212A of the vibrating film 212. This vibrating part 212A forms the vibrating area which can be vibrated by the piezoelectric element 22.

Configuration of Piezoelectric Element 22

The piezoelectric elements 22 are disposed on one surface (a surface on the −Z side) of the vibrating film 212, and at positions overlapping the respective vibrating parts 212A in the plan view viewed from the Z direction. As shown in FIG. 5, the piezoelectric element 22 is configured by sequentially stacking a first electrode 221, a piezoelectric film 222 and a second electrode 223 on the vibrating film 212.

Specifically, as shown in FIG. 4, the first electrode 221 is formed linearly along the X direction. Both end parts (±X side end parts) of the first electrode 221 form first electrode terminals 221P to be connected to the transmission circuit board 31 for controlling, for example, the transmission section 151.

Further, the second electrode 223 is linearly formed along the Y direction. The ±Y side end parts of the second electrode 223 are respectively connected to common electrode lines 223A. The common electrode lines 223A each connect the plurality of second electrodes 223 disposed in the X direction to each other, and both end parts (±X side end parts) of each of the common electrode lines 223A form second electrode terminals 223P to be connected to the transmission circuit board 31.

The piezoelectric film 222 is formed of a thin film of a piezoelectric material such as lead zirconate titanate (PZT).

Here, one ultrasonic transducer (a transmission element 23) is constituted by one vibrating section 212A in the vibrating film 212, and the piezoelectric element 22 disposed on the vibrating section 212A. Therefore, as shown in FIG. 4, in the transmission section 151, there is disposed a plurality of transmission elements 23 along the X direction and the Y direction.

Further, in the transmission section 151 of the present embodiment, the first electrode 221 is common to the plurality of transmission elements 23 disposed in the X direction, and the plurality of transmission elements 23 disposed in the X direction constitutes 1-Ch (channel) transmission column 23A (see FIG. 4). Further, a plurality of the 1-Ch transmission columns 23A arranged side by side along the Y direction constitutes the transmission section 151 having a one-dimensional array structure. In other words, in the present embodiment, the plurality of transmission columns 23A is arranged along the Y direction crossing the sensor central axis 15C as a first axis according to the present disclosure.

In the transmission elements 23 having such a configuration, by a drive signal (a voltage signal) being applied between the first electrode 221 and the second electrode 223, the piezoelectric films 222 extend or contract, and thus, the vibrating sections 212A of the vibrating film 212 provided with the piezoelectric elements 22 vibrate with a frequency corresponding to the aperture width or the like of the aperture parts 211A. Thus, the ultrasonic wave is transmitted from the +Z side (the aperture part 211A side) of the vibrating sections 212A.

Further, the transmission section 151 of the present embodiment makes the input timings of the drive signal to the respective transmission columns 23A arranged along the Y direction different from each other to thereby control the beam shape of the ultrasonic wave, and thus, forms the ultrasonic beam so that the ultrasonic wave converges on a predetermined focal point (beam focusing). In the present embodiment, the focal point of the beam focusing becomes the aperture center of the first aperture part 153A of the first base 153. The detailed explanation of the beam focusing will be described later.

Configuration of Reception Section 152

As shown in FIG. 3, the reception section 152 is disposed so that the reception surface 152F is opposed to the transmission surface 151F. Specifically, the reception section 152 is disposed so that the reception surface 152F becomes perpendicular (or roughly perpendicular) to the sensor central axis 15C connecting the center of the reception section 152 and the center of the transmission section 151 to each other.

The reception section 152 can be configured with roughly the same configuration as that of the transmission section 151. In other words, it is possible to provide the reception section 152 with such a configuration having the element substrate 21 and the piezoelectric elements 22 as shown in FIG. 4 and FIG. 5. In this case, one reception element is constituted by one vibrating section 212A and the piezoelectric element 22 on that vibrating section 212A. In such a reception element, by the vibrating section 212A receiving the ultrasonic wave to vibrate, the reception signal is output from the piezoelectric element 22. Since the element substrate 21 and the piezoelectric elements 22 constituting the reception elements are the same as those of the transmission section 151, the description thereof will be omitted here.

It should be noted that the ultrasonic sensor 15 according to the present embodiment is for detecting the overlap feed by measuring the sound pressure of the ultrasonic wave having passed through the form P. Therefore, it is sufficient for the ultrasonic wave transmitted from the transmission section 151 to be received anywhere in the reception surface 152F of the reception section 152. In this case, it is also possible to connect the plurality of piezoelectric elements 22 disposed in the reception section 152 in series to each other to output the reception signal obtained by adding the signals from the respective piezoelectric elements 22.

Aperture Area and Aperture Width of First Aperture Part 153A, Second Aperture Part 154A Then, the aperture area and the aperture width of the first aperture part 153A, the second aperture part 154A in the present embodiment will be described.

Figure 6:
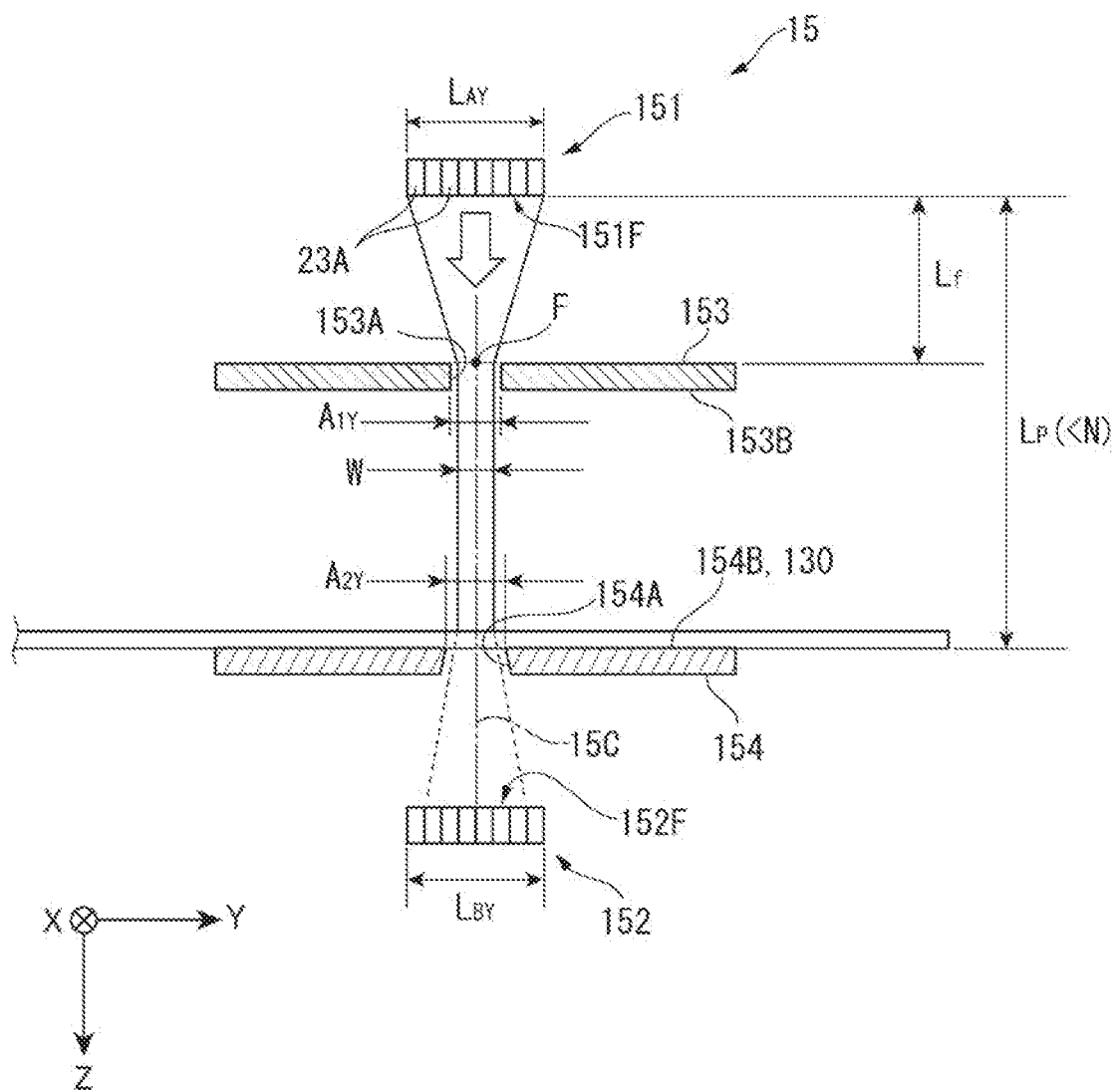
FIG. 6 is a schematic diagram for explaining a beam shape of a transmitted ultrasonic wave in the case of viewing the ultrasonic sensor from an X direction in the first embodiment.

FIG. 6 is a schematic diagram for explaining a beam shape of a transmitted ultrasonic wave in the case of viewing the ultrasonic sensor 15 from the X direction.

In the present embodiment, as described above, in the transmission section 151, by performing the delayed drive of the transmission columns 23A, the wave surfaces of the transmitted ultrasonic waves are combined with each other to perform the beam focusing.

Figure 7:
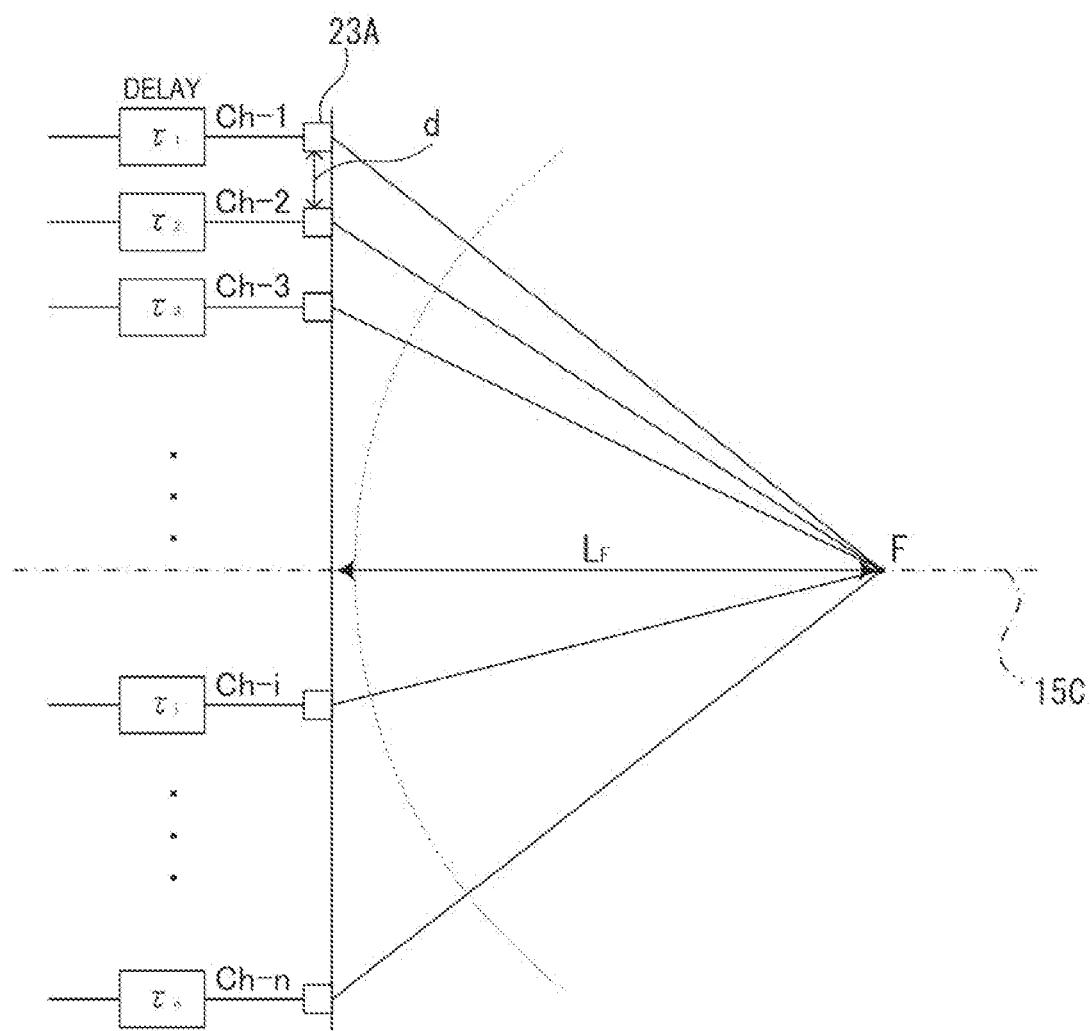
FIG. 7 is a diagram for explaining beam focusing.

FIG. 7 is a diagram for describing the beam focusing. In the beam focusing, the transmission section 151 delays the plurality of transmission columns 23A arranged in the Y direction from the transmission columns 23A in the ±Y side end parts toward the transmission column 23A at the center in the Y direction as shown in FIG. 7. Thus, as shown in FIG. 7, the wave surfaces (the dotted line in FIG. 7) formed by the ultrasonic waves emitted from the respective transmission columns 23A proceed so as to converge on the focal point F. In the present embodiment, the focal point F is the aperture center of the first aperture part 153A, and more specifically, an intersection between a surface of the first base 153 on the opposite side to the second base 154 (the conveying surface 130) and the sensor center axis 15C, as shown in FIG. 6.

Here, a distance from the transmission surface 151F to the focal point F is defined as $L_F$, an element pitch (a distance between the transmission columns 23A (between the transmission elements 23)) is defined as d, the sonic speed of the ultrasonic waves is defined as c, and the number of channels (the number of the transmission columns 23A) is defined as n. In the case of numbering the transmission columns 23A in sequence defining the transmission column 23A located at the −Y side end part as a first channel (Ch-1 in FIG. 7), the delay time $\tau_i$ when driving the transmission column 23A of the i channel (Ch-i in FIG. 7) is expressed as the following formula (1).

$$\tau_i = \frac{d^2}{2cf}\left\{\left(\frac{n-1}{2}\right)^2 - \left(i - \frac{n+1}{2}\right)^2\right\} \quad (1)$$

Incidentally, the ultrasonic wave has a property of converging in the near sound field, and diverging in the far sound field exceeding the near sound field threshold distance N. Therefore, in order to converge the ultrasonic wave on the focal position F, it is necessary for the focal point F to be included in the near sound field. In other words, the distance (the focal distance $L_F$) from the transmission surface 151F to the focal point F is set to be equal to or shorter than near sound field threshold distance N.

Here, the near sound field threshold distance N is expressed as the following formula (2) defining the array aperture width (the width in the Y direction of the transmission surface 151F) of the transmission section 151 as $L_{AY}$.

$$N = 1.37\frac{L_{AY}^2 f}{4c} \quad (2)$$

Further, as described above, when performing the beam focusing, the beam width W (the width in the Y direction) of the ultrasonic wave at the focal point F has the dimension expressed as the formula (3), and the ultrasonic wave is output toward the form P.

$$W = 1.02\frac{L_F c}{f L_{AY}} \quad (3)$$

Further, in the present embodiment, the aperture area of the first aperture part 153A is smaller than the transmission surface 151F of the transmission section 151. Specifically, the first aperture part 153A is formed so that the aperture width $A_{1Y}$ in the Y direction of the first aperture part 153A is smaller than the width $L_{AY}$ in the Y direction of the transmission surface 151F, and equal to or larger than the beam width W at the focal point F. It should be noted that it is preferable to make $A_{1Y}$=W true in order to make the aperture area of the first aperture part 153A equal to the minimum area for the transmitted ultrasonic wave to pass.

Here, in the case in which the aperture area of the first aperture part 153A is large, there is a possibility that a part of the form P is caught by the first aperture part 153A to thereby cause the wrinkle of the form P or the jam of the form P in the case in which the form P is conveyed along the conveying surface 130. For example, in the related-art overlap feed sensor, since the ultrasonic wave is linearly output from the transmission surface of the ultrasonic wave transmission section, the beam width of the ultrasonic wave becomes equal to the width of the transmission surface. Further, in order to suppress the reflection of the ultrasonic wave transmitted from the transmission section by the first base, it is necessary to make the aperture area (the aperture width) of the first aperture part equal to or larger than the beam width of the ultrasonic wave. Therefore, it is necessary for the first aperture part to be formed so that the aperture area of the first aperture part is equal to or larger than the area of the transmission surface, and since the area of the first aperture part increases, the catch of the form P becomes easy to occur accordingly.

In contrast, in the present embodiment, since the beam width of the transmitted ultrasonic wave is narrowed down due to the beam focusing, it is possible to make the aperture area (the aperture width) of the first aperture part 153A smaller than the transmission surface 151F. Thus, it is possible to suppress an inconvenience such as the wrinkle or jam of the form P.

Further, since the first aperture part 153A has the aperture width $A_{1Y}$ equal to or larger than the beam width W at the focal point F, it is possible to suppress the reflection of the ultrasonic wave transmitted from the transmission section 151 by the first base 153. In other words, it is possible to output the ultrasonic wave high in sound pressure toward the form P while decreasing the aperture area of the first aperture part 153A.

Figure 8:
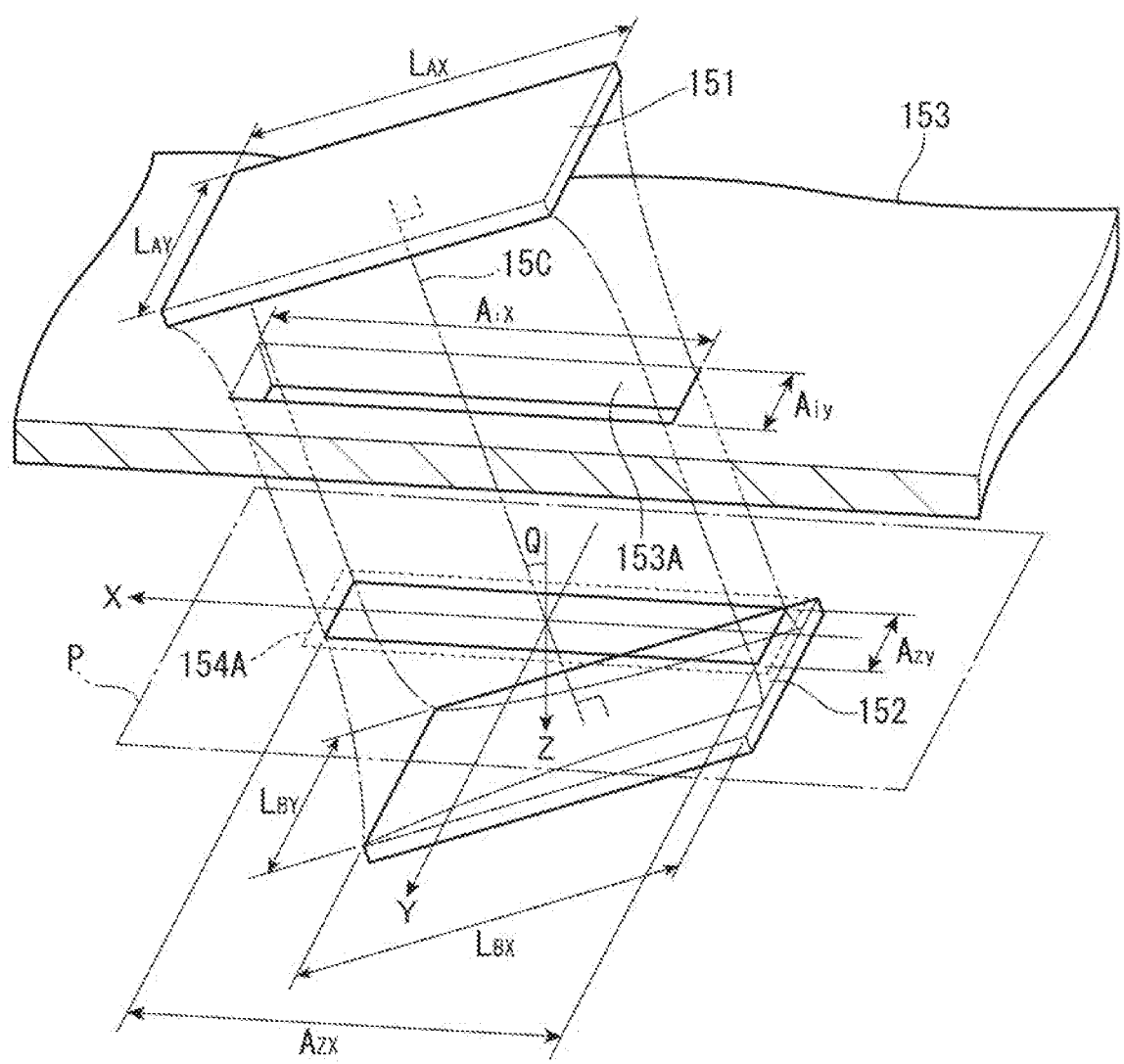
FIG. 8 is a perspective view schematically showing a schematic shape of the ultrasonic beam of the first embodiment.

FIG. 8 is a perspective view schematically showing a schematic shape of the ultrasonic beam of the present embodiment.

FIG. 6 is a schematic view of the ultrasonic sensor 15 viewed from the X direction, but in the case of viewing the ultrasonic sensor 15 from the Y direction, the sensor central axis 15C is tilted at the angle θ with respect to the conveying surface 130 as shown in FIG. 3. Further, in the present embodiment, the transmission columns 23A are each constituted by the plurality of transmission elements disposed in the X direction, and therefore, does not perform the beam focusing with respect to the X direction. Therefore, the ultrasonic wave transmitted from the transmission section 151 becomes as shown in FIG. 8, and has a beam shape in which the beam width gradually decreases toward the first aperture part 153A with respect to the Y direction, the beam width is roughly the same as the width $L_{AX}$ in the X direction of the transmission surface 151F with respect to the X direction. Therefore, in order to suppress the reflection of the ultrasonic beam by the first base 153, the aperture width $A_{1X}$ in the X direction of the first aperture part 153A is set to $A_{1X} \geq L_{AX}/\cos\theta$. It should be noted that it is preferable to make $A_{1X} = L_{AX}/\cos\theta$ true in order to make the aperture area of the first aperture part 153A equal to the minimum area for the transmitted ultrasonic wave to pass.

Incidentally, in the case of converging the ultrasonic wave on the focal point F due to the beam focusing, the beam width of the ultrasonic wave is kept roughly constant in a zone (focal depth of the beam) from the focal point F to the near sound field threshold distance N.

In the present embodiment, the distance $L_P$ from the transmission surface 151F to the conveying surface 130 becomes no less than the focal distance $L_F$, and no more than the near sound field threshold distance N. In other words, the conveying surface 130 is located within the focal depth of the beam. Therefore, it is possible to make the ultrasonic wave having the beam width W roughly the same as that of the ultrasonic beam at the focal point F and high in sound pressure enter the form P conveyed on the conveying surface 130.

Then, when the ultrasonic beam enters the form P, the ultrasonic wave having the sound pressure corresponding to the thickness of the form P is transmitted through the form P. For example, in the case in which two or more forms P overlap each other, since the thickness becomes large, the sound pressure of the ultrasonic wave transmitted therethrough decreases.

Further, the ultrasonic wave having been transmitted through the form P proceeds from the incident position of the ultrasonic wave having entered the form P so as to diverge, and the beam width of the ultrasonic wave having been transmitted gradually increases as getting away from the form P as shown in FIG. 6 and FIG. 8.

In the present embodiment, the aperture area of the second aperture part 154A through which the transmitted ultrasonic wave passes is larger than the aperture area of the first aperture part 153A, and is smaller than the area of the reception surface 152F of the reception section 152. More specifically, the aperture width $A_{2Y}$ in the Y direction of the second aperture part 154A is larger than the aperture width $A_{1Y}$ in the Y direction of the first aperture part 153A, and is smaller than the width $L_{BY}$ in the Y direction of the reception surface 152F. Therefore, it is possible to suppress the inconvenience that the transmitted ultrasonic wave having been transmitted through the form P is blocked by the second base 154, and further, it is possible to make the reception section 152 receive the ultrasonic wave having the beam width which spreads as getting away from the form P. It should be noted that the aperture width $A_{2Y}$ in the Y direction of the second aperture part 154A is dependent on the thickness along the sensor central axis 15C of the second base 154 and the distance from the conveying surface 130 to the second base 154. Specifically, in the case in which the thickness of the second base 154 is large, and the distance from the conveying surface 130 to the second base 154 is also long, the aperture width $A_{2Y}$ in the Y direction of the second aperture part 154A also increases in accordance with the spreading beam diameter. Therefore, it is preferable for the second base 154 to be made smaller in thickness along the sensor central axis 15C than the first base 153 to make the distance from the conveying surface 130 to the reception section 152 shorter than the distance from the conveying surface 130 to the transmission section 151.

In contrast, it is sufficient for the aperture width $A_{2X}$ of the second aperture part 154A with respect to the X direction in which the beam focusing is not performed to be equal to or larger than the aperture width $A_{1X}$ in the X direction of the first aperture part 153A.

In the present embodiment, the surface (the second guide surface 154B) of the second base 154 opposed to the first base 153 coincides with the conveying surface 130. In other words, the form P is conveyed along the surface of the second base 154 opposed to the first base 153. In this case, it is possible to minimize the aperture area of the second aperture part 154A, and further, it becomes also possible to dispose the reception section 152 near to the form P, and therefore, it is also possible to make the area of the reception surface 152F small.

Circuit Configuration of Ultrasonic Sensor 15

Figure 9:
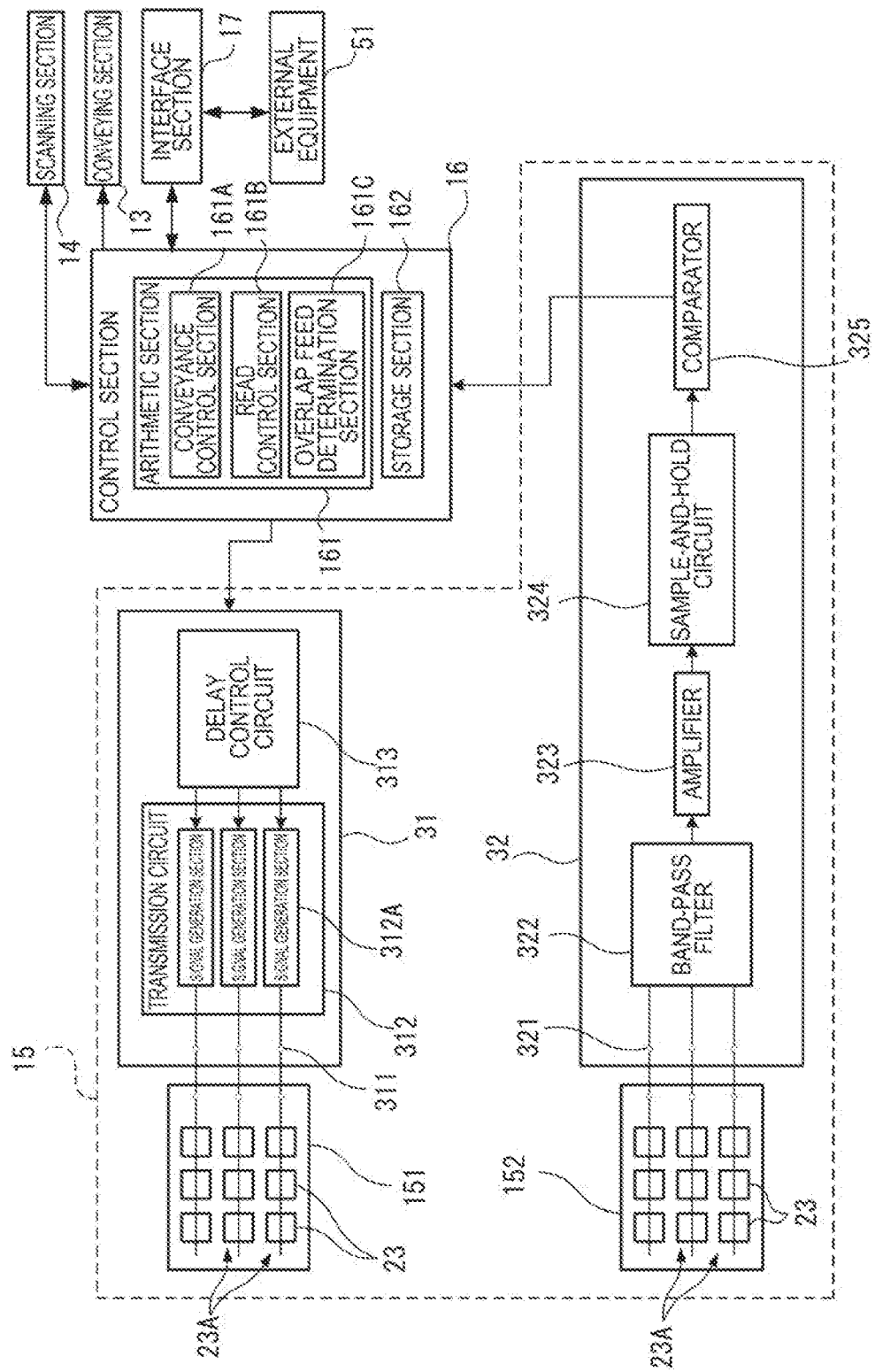
FIG. 9 is a block diagram showing a control system of the image scanner according to the first embodiment.

FIG. 9 is a block diagram showing a control configuration of the image scanner 10.

In the present embodiment, as a circuit configuration of the ultrasonic sensor 15, the transmission circuit board 31 is provided with a transmission control circuit for controlling the drive of the transmission section 151, and the reception circuit board 32 is provided with a reception processing circuit for controlling the drive of the reception section 152. It should be noted that the circuit configuration of the ultrasonic sensor 15 is not limited to the above, but as described above, it is possible to provide the circuit configuration for controlling the reception section 152 integrally to the transmission circuit board 31, or it is also possible to provide the circuit configuration for controlling the transmission section 151 integrally to the reception circuit board 32. Besides the above, it is also possible to configure these circuit configurations with a plurality of circuit boards.

As shown in FIG. 9, in the present embodiment, the transmission circuit board 31 is provided with transmission terminals 311, a transmission circuit 312 and a delay control circuit 313.

The transmission terminal 311 is disposed to the respective transmission columns 23A of the transmission section 151, and each connect the first electrode 221 of the transmission column 23A and the transmission circuit 312 to each other.

The transmission circuits 312 each generate the drive signal for driving the transmission column 23A. The transmission circuit 312 is provided with a plurality of signal generation sections 312A corresponding respectively to the transmission columns 23A each of which generates the drive signal at the timing based on the control signal from the delay control circuit 313 to output the drive signal to the transmission section 151.

The delay control circuit 313 controls the timings of the drive signals generated by the transmission circuit 312. Specifically, the delay control circuit 313 outputs a command signal meaning for generating the drive signal to the signal generation section 312A corresponding to the i-th channel with the delay time $\tau_i$ expressed as the formula (1) described above. Thus, the drive signal is generated in the signal generation section 312A based on the command signal, and is then input to the transmission column 23A of the i-th channel.

Further, the reception circuit board 32 is provided with a ground circuit for setting the second electrode terminals to a reference potential, the reception circuit for processing the reception signals input from the first electrode terminals to output the result to the control section 16, and so on. As the reception circuit, there can be used a general circuit for processing the input signals input due to the reception of the ultrasonic wave. As shown in FIG. 9, the reception circuit can be constituted by, for example, reception terminals 321, a band-pass filter 322, an amplifier 323, a sample-and-hold circuit 324, and a comparator 325. The reception signals output from the reception section 152 are input from the reception terminals 321 to the band-pass filter 322. A noise component or the like is removed by the band-pass filter 322 from the reception signals, then the reception signals are amplified by the amplifier 323 so as to have the signal intensity equal to or higher than a predetermined level, and are then input to the sample-and-hold circuit 324. The sample-and-hold circuit 324 samples the reception signals with a predetermined frequency, and then the reception signals thus sampled are input to the comparator 325. The comparator 325 detects the reception signal having the signal intensity exceeding a predetermined threshold value out of the reception signals thus sampled, and then inputs the reception signals thus detected to the control section 16.

Configuration of Control Section 16

As shown in FIG. 9, the control section 16 is provided with an arithmetic section 161 constituted by a central processing unit (CPU) and so on, and a storage section 162 constituted by a recording circuit such as a memory.

The control section 16 is coupled to the conveying motor 135 of the conveying section 13, the scanning section 14 and the ultrasonic sensor 15 to control the drive of the conveying motor 135, the scanning section 14 and the ultrasonic sensor 15. Further, the control section 16 is coupled to an interface section 17 to receive a variety of types of data and signals input from external equipment 51 such as a personal computer, and output read data read by the image scanner 10 to the external equipment 51.

On the storage section 162, there are recorded a variety of types of data and a variety of programs for controlling the image scanner 10.

The arithmetic section 161 reads and then executes the variety of programs stored in the storage section 162 to thereby function as a conveyance control section 161A, a read control section 161B, an overlap feed determination section 161C, and so on as shown in FIG. 9.

The conveyance control section 161A controls the conveying motor 135 of the conveying section 13 to rotate the plurality of roller pairs 131 through 134 to thereby feed the forms P set on the form support 12 one by one into the main body 11. Further, the conveyance control section 161A makes the form P thus fed be conveyed along the conveying surface 130.

The read control section 161B controls the scanning section 14 during the conveyance of the form P to make the image of the form P be read.

The overlap feed determination section 161C corresponds to a state detection section according to the present disclosure, and controls the ultrasonic sensor 15 to determine the overlap feed of the form P based on the reception signals input from the reception section 152.

Specifically, in the case in which the voltage value of the reception signal is lower than a predetermined threshold value, the overlap feed determination section determines that the forms P are fed in an overlapped manner. It should be noted that in the case in which the overlap feed determination section 161C has determined that the overlap feed has occurred, the conveyance control section 161A stops the conveyance of the form P.

Functions and Advantages of Present Embodiment

In the image scanner 10 according to the present embodiment, there are provided the ultrasonic sensor 15 for transmitting/receiving the ultrasonic wave to/from the form P conveyed on the conveying surface 130, and the control section 16 functioning as the overlap feed determination section 161C (the state detection section) for detecting the overlap feed of the form P in accordance with the transmission/reception result of the ultrasonic wave of the ultrasonic sensor 15.

The ultrasonic sensor 15 is provided with a first base 153 opposed to the conveying surface 130 for the form P to be conveyed by the conveying section 13, the transmission section 151 which is disposed on the sensor central axis 15C tilted with respect to the conveying surface 130, and on the opposite side of the first base 153 to the conveying surface 130, and the reception section 152 which is disposed on the sensor central axis 15C, and on the opposite side of the conveying surface 130 to the transmission section 151. Further, in the transmission section 151, the plurality of transmission elements 23 (the transmission columns 23A) for transmitting the ultrasonic wave is disposed along the Y direction crossing the sensor central axis 15C. Further, the first base 153 is provided with the first aperture part 153A opening on the sensor central axis 15C, and the first aperture part 153A is formed to have the smaller aperture area than the transmission surface 151F of the transmission section 151. Further, the transmission section 151 performs the delayed drive with the delay time $\tau_i$ on each of the transmission elements 23 to thereby converge the transmitted ultrasonic wave toward the first aperture part 153A of the first base 153.

In such an ultrasonic sensor 15, the aperture width $A_{1Y}$ in the Y direction of the first aperture part 153A provided to the first base 153 is smaller than the width $L_{AY}$ in the Y direction of the transmission surface 151F, and when conveying the form P along the conveying surface 130, it becomes difficult for the form P to be caught by the first aperture part 153A, and it is possible to suppress the wrinkle and jam of the form P. Further, by performing the delayed drive with the delay time $\tau_i$ on the transmission columns 23A, focusing of the transmitted ultrasonic waves from the transmission section 151 on the center of the first aperture part 153A as the focal point F is performed. Therefore, even if the aperture area of the first aperture part 153A is decreased, it is possible to make the ultrasonic wave with predetermined sound pressure reach the form P. Further, since the ultrasonic waves converged in such a manner reinforce each other to increase the sound pressure, it is also possible to improve the detection accuracy in the overlap feed detection process in the overlap feed determination section 161C (the state detection section).

In the ultrasonic sensor 15 according to the present embodiment, the transmission section 151 converges the ultrasonic waves on the center of the first aperture part 153A as the focal point F. In the case of performing the delayed drive on the plurality of transmission columns 23A (the transmission elements 23) to achieve the beam focusing, the beam width of the transmitted ultrasonic wave is minimized at the focal point F. Therefore, by performing the beam focusing on the center of the first aperture part 153A as the focal point F, it is possible to minimize the aperture area of the first aperture part 153A, and it is possible to preferably suppress the wrinkle and jam of the form P.

In the present embodiment, the transmission section 151 is disposed so that the conveying surface 130 is located within the focal depth of the beam of the ultrasonic waves converged by the transmission section 151.

Therefore, in the present embodiment, the ultrasonic waves converged due to the beam focusing can be input to the form P. In this case, since the sound pressure of the ultrasonic waves input to the form P becomes high, the sound pressure of the ultrasonic waves to be transmitted through the form P also becomes high, and the signal intensity of the reception signal when receiving the ultrasonic wave by the reception section 152 can also be made high. Therefore, it is possible to realize the highly accurate transmission/reception process of the ultrasonic wave with the influence of the noise or the like suppressed, and it is possible to accurately detect the overlap feed of the form P.

In the ultrasonic sensor 15 according to the present embodiment, there is provided the second base 154 disposed on the opposite side of the conveying surface 130 to the first base 153, and between the reception section 152 and the conveying surface 130, and on the sensor central axis 15C of the second base 154, there is disposed the second aperture part 154A having the aperture area smaller than the reception surface 152F.

As described above, by making the aperture area of the second aperture part 154A small, it is possible to suppress the catch of the form P by the second aperture part 154A to suppress the wrinkle and jam of the form P due to the catch.

In the ultrasonic sensor 15 according to the present embodiment, the aperture area of the second aperture part 154A is larger than the aperture area of the first aperture part 153A.

When the ultrasonic wave which proceeds linearly and has the beam width W is input to the form P, the beam width of the ultrasonic wave having been transmitted through the form P spreads as the ultrasonic wave gets away from the conveying surface 130. Therefore, if the aperture area of the second aperture part 154A is made smaller than the aperture area of the first aperture part 153A, a part of the ultrasonic wave having been transmitted through the form P fails to pass through the second aperture part 154A, but is reflected by the second base 154, and thus, the reception intensity in the reception section 152 lowers. In contrast, in the present embodiment, since the second aperture part 154A has the larger aperture area than that of the first aperture part 153A, the reflection of the ultrasonic wave by the second base 154 can be suppressed.

In the ultrasonic sensor 15 according to the present embodiment, the surface of the second base 154 opposed to the first base 153 forms the conveying surface 130 on which the form P is conveyed.

In such a configuration, after the ultrasonic wave is input to the form P, the ultrasonic wave having been transmitted through the form P passes through the second aperture part 154A contiguous to the conveying surface 130. Therefore, since it is sufficient for the second aperture part 154A to be at least no smaller than the area of the beam irradiation section to the form P, it is possible to minimize the aperture area of the second aperture part 154A.

Second Embodiment

Then, a second embodiment according to the present disclosure will be described.

In the first embodiment, the transmission section 151 is provided with the plurality of transmission columns 23A disposed along the Y direction, and performs the beam focusing defining the center of the first aperture part 153A as the focal point F by performing the delayed drive on the transmission columns 23A. In contrast, the second embodiment is different from the first embodiment described above in the point of individually driving each of the transmission elements 23 arranged in a two-dimensional array structure in the X direction and the Y direction to thereby perform the beam focusing. It should be noted that in the following description, the matters having already been described are denoted by the same reference symbols, and the description thereof will be omitted or simplified.

Figure 10:
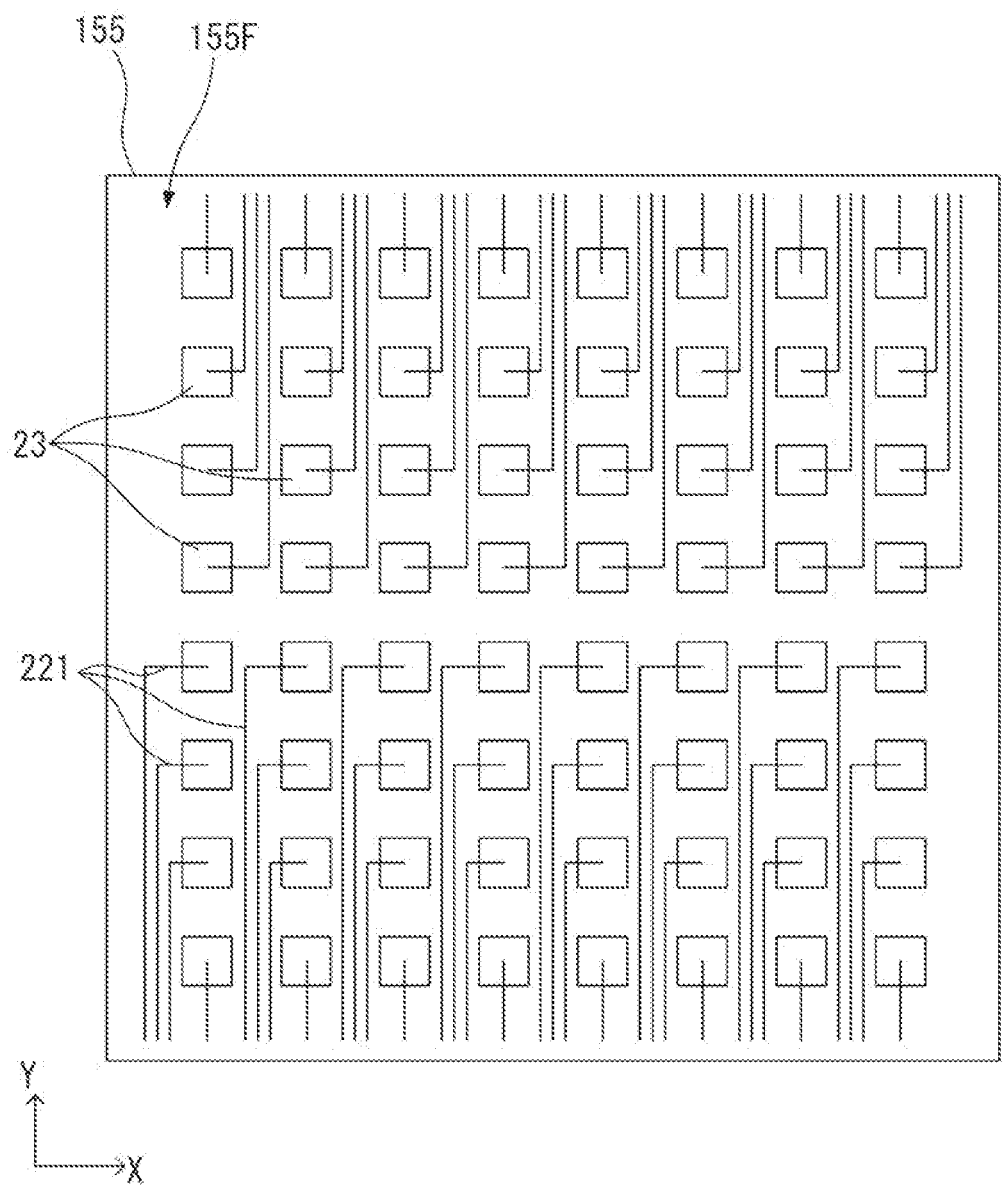
FIG. 10 is a schematic plan view showing an arrangement configuration of transmission elements in a transmission main body part of an ultrasonic sensor according to a second embodiment.

FIG. 10 is a schematic plan view showing an arrangement configuration example of the transmission elements 23 of a transmission section 155 in the second embodiment.

In the present embodiment, as shown in FIG. 10, the transmission section 155 has the transmission elements 23 arranged in the two-dimensional array structure in the X-Y plane. It should be noted that the illustration of the second electrodes 223 is omitted in FIG. 10.

In such a present embodiment, in the transmission circuit 312, by disposing signal generation sections 312A correspondingly respectively to the transmission elements 23, it becomes possible to drive the transmission elements 23 independently of each other and at arbitrary timings.

Further, in the present embodiment, the delay control circuit 313 controls the delay time for driving each of the transmission elements 23 so that the ultrasonic waves output from the respective transmission elements 23 converge on the center of the first aperture part 153A as the focal point F. In other words, in the present embodiment, the delay control is performed not only on the transmission elements 23 arranged in the Y direction but also on the transmission elements 23 arranged in the X direction.

Figure 11:
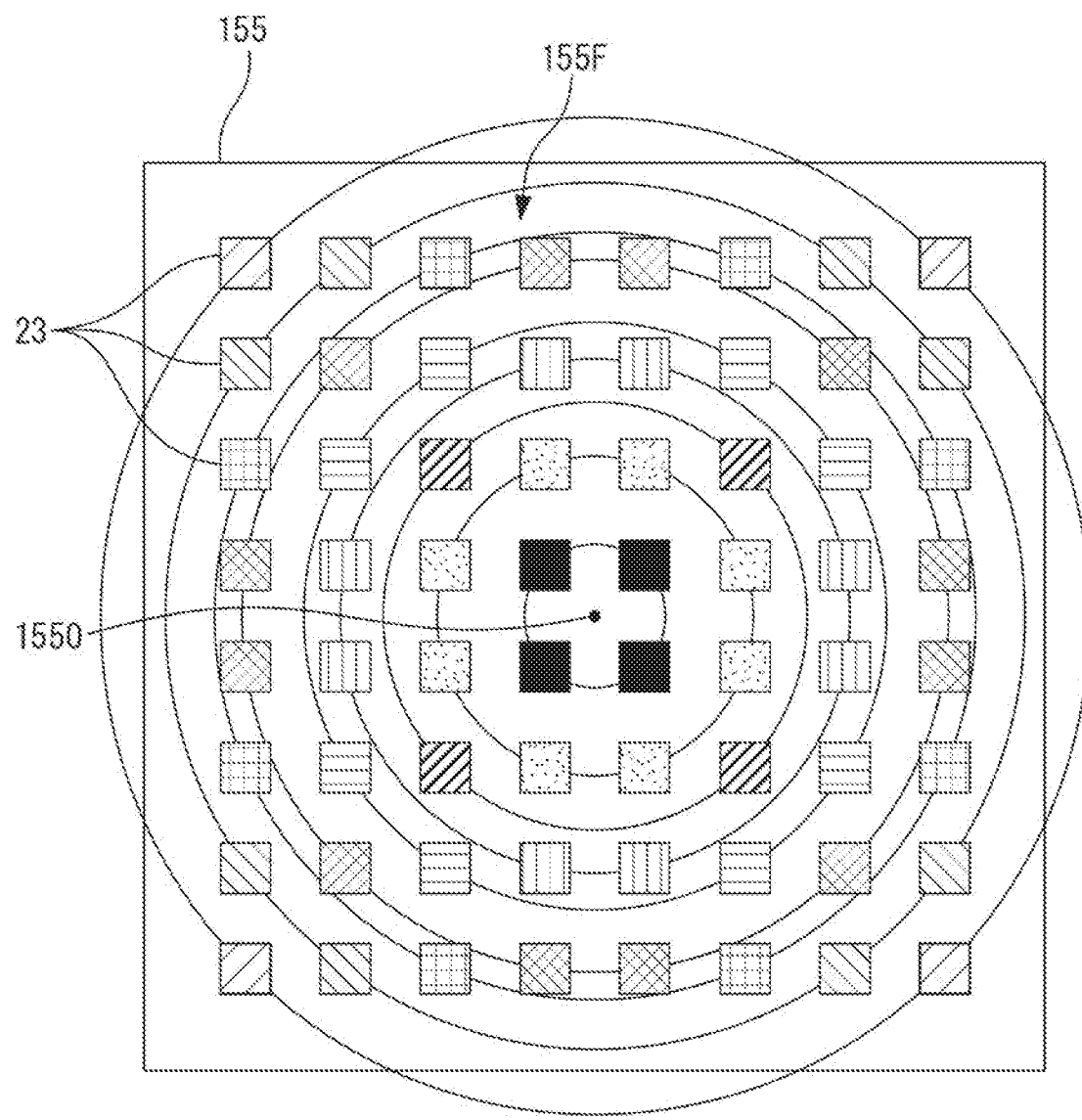
FIG. 11 is a diagram for explaining a delayed drive sequence of the transmission elements when performing the beam focusing in a transmission section of the second embodiment.

FIG. 11 is a diagram for explaining the delay control on each of the transmission elements 23 in the transmission section 155 according to the present embodiment.

In the case of converging the ultrasonic waves on the focal point F on the sensor central axis 15C, defining the transmission elements 23 (the transmission elements 23 disposed on the same circle in FIG. 11) having the same distance from a central point 1550 of the transmission surface 155F as one element group, the element groups are driven with a delay in the descending order of the distance from the central point 1550 as shown in FIG. 11. In the example shown in FIG. 11, the transmission elements 23 are arranged eight by eight at an equal pitch in the X direction and the Y direction, and in this case, nine element groups are formed. The delay time for driving the element group varies in accordance with a difference in radius between the distance of the transmission elements 23 of the element group driven last from the central point 1550, and the distance of the transmission elements 23 of the element group to be driven next from the central point 1550, and the shorter the difference in radius is, the shorter the delay time becomes.

Figure 12:
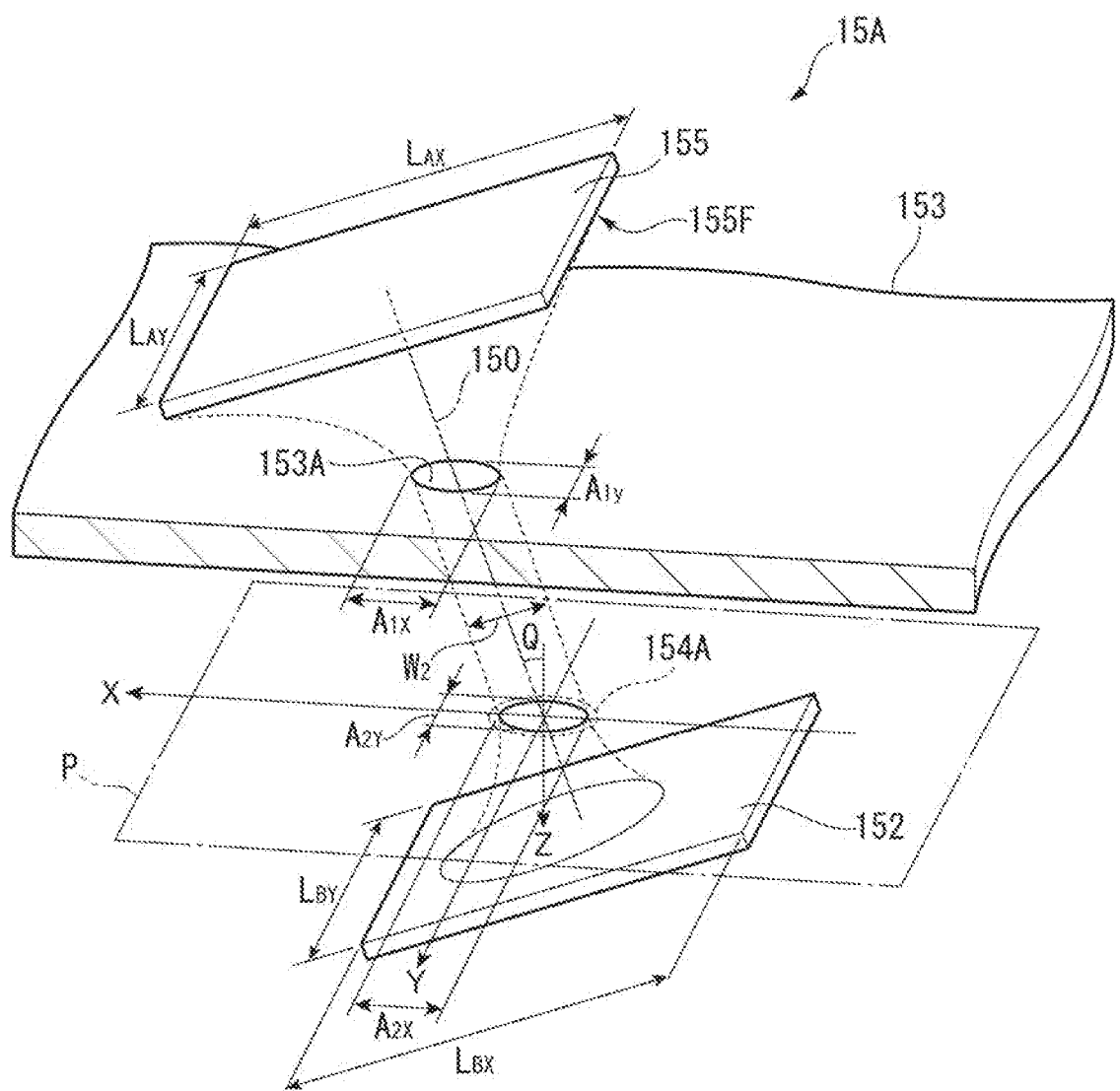
FIG. 12 is a schematic view showing a schematic shape of an ultrasonic beam of the ultrasonic sensor according to the second embodiment.

FIG. 12 is a schematic diagram showing a beam shape of the ultrasonic wave transmitted from the transmission section 155 in the present embodiment.

As shown in FIG. 12, in the present embodiment, by delaying each of the transmission elements 23 arranged in the two-dimensional array structure, the transmitted ultrasonic wave is provided with the beam shape converging on the focal point F in the case of viewing the ultrasonic sensor 15A from either of the X direction and the Y direction.

Therefore, it is possible to make both of the aperture width $A_{1X}$ in the X direction and the aperture width $A_{1Y}$ in the Y direction of the first aperture part 153A small in accordance with the beam diameter $W_2$ in the focal depth of the beam, and thus, it is possible to make the aperture area of the first aperture part 153A smaller compared to the first embodiment.

Specifically, defining the beam diameter of the transmitted ultrasonic wave in the focal depth of the beam from the focal point F to the near sound field threshold distance N as $W_2$, and defining the width in the Y direction of the transmission surface 155F as $L_{AY}$, it is possible to make the aperture width $A_{1Y}$ in the Y direction of the first aperture part 153A fulfill $L_{AY} > A_{1Y} \geq W_2$, and preferably fulfill $A_{1Y} = W_2$. Further, in the present embodiment, defining the width in the X direction of the transmission surface 155F as $L_{AX}$, the aperture width $A_{1X}$ in the X direction of the first aperture part 153A can be made to fulfill $L_{AX} > A_{1X} \geq W_2/\cos \theta$, and preferably fulfill $A_{1X} = W_2/\cos \theta$.

Further, as shown in FIG. 12, the range of the transmitted ultrasonic wave input to the form P also becomes smaller compared to the first embodiment. Therefore, it is possible to make the aperture width $A_{2X}$ in the X direction of the second aperture part 154A smaller compared to the first embodiment, and accordingly, the aperture area of the second aperture part 154A can be made smaller.

As described hereinabove, in the ultrasonic sensor 15A according to the second embodiment, it is possible to make the aperture width $A_{1X}$ in the X direction of the first aperture part 153A and the aperture width $A_{2X}$ in the X direction of the second aperture part 154A smaller. Therefore, it is possible to make the aperture area smaller compared to the first embodiment, accordingly. Thus, it is possible to suppress the catch of the form P by the first aperture part 153A and the second aperture part 154A when conveying the form P, and it is possible to effectively suppress the wrinkle or jam of the form P.

MODIFIED EXAMPLES

It should be noted that the present disclosure is not limited to each of the embodiments described above, but includes modifications and improvements within a range where the advantages of the present disclosure can be achieved, and configurations, which can be obtained by, for example, arbitrarily combining the embodiments.

Modified Example 1

In the first embodiment and the second embodiment, there is described the example in which the sensor central axis 15C is tilted at an angle θ with respect to the normal line of the form P when viewing the ultrasonic sensor 15 from the conveying direction (the Y direction), but this is not a limitation.

For example, it is also possible to dispose the transmission section 151 (155) and the reception section 152 so that the sensor central axis 15C is tilted by θ with respect to the normal line of the form P when viewing the ultrasonic sensor 15 from the X direction.

Modified Example 2

In the first embodiment, there is described the example in which the plurality of transmission columns 23A is disposed along the Y direction, but it is also possible to adopt a configuration in which the plurality of transmission columns 23A is disposed along the X direction.

In this case, it is possible to make the aperture widths $A_{1X}$, $A_{2X}$ in the X direction of the first aperture part 153A and the second aperture part 154A small in accordance with the beam width in the X direction at the focal position F.

Further, in the first embodiment, the first aperture part 153A and the second aperture part 154A each have an aperture shape elongated in the X direction. In this case, for example, when the form P deflects in the X direction due to the own weight when being conveyed in the Y direction, there is a possibility that the deflected part of the form P enters the first aperture part 153A or the second aperture part 154A to be caught by the first aperture part 153A or the second aperture part 154A.

In contrast, in the modified example 2, the first aperture part 153A and the second aperture part 154A each have an aperture shape elongated in the Y direction. Therefore, even in the case in which the form P is deflected along the X direction due to the own weight, the aperture width in the X direction of the first aperture part 153A and the second aperture part 154A is small, and therefore, it is possible to suppress the inconvenience that the form P enters the inside of the first aperture part 153A or the second aperture part 154A, and it is possible to more effectively suppress the catch of the form P.

Modified Example 3

In the first embodiment, there is described the example in which the transmission circuit 312 has the signal generation sections 312A corresponding respectively to the transmission columns 23A, and in the second embodiment, there is described the example in which the transmission circuit 312 has the signal generation sections 312A corresponding respectively to the transmission elements 23, but these are not limitations.

Specifically, it is also possible to adopt a configuration in which one signal generation section 312A is disposed corresponding to the transmission columns 23A or the transmission elements 23 which input the drive signals at the same time in the beam focusing. For example, although in the second embodiment, there is described the example in which nine element groups are provided, it is also possible to adopt a configuration in which the signal generation section 312A is not provided for each of the transmission elements 23, but is provided for each of the transmission groups.

Modified Example 4

In the first embodiment and the second embodiment, there is described the example in which the transmission surface 151F (155F) and the reception surface 152F are perpendicular to the sensor central axis 15C, but this is not a limitation.

For example, in the first embodiment, in the case of adopting a configuration in which the plurality of transmission columns 23A is arranged along the X direction, the transmission surface 151F and the sensor central axis 15C are not required to be perpendicular to each other. In this case, by controlling the delay timings of the plurality of transmission columns 23A, it is possible to converge the ultrasonic waves toward the focal point F on the sensor central axis 15C.

Further, the same applies to the second embodiment, by controlling each of the input timings of the drive signals with respect to the respective transmission elements 23, it is possible to converge the ultrasonic waves on the focal point F on the sensor central axis 15C.

Modified Example 5

In the first embodiment and the second embodiment, the transmission section 151 (155) performs the beam focusing on the intersection between the surface of the first base 153 on the opposite side to the second base 154 and the sensor central axis 15C as the focal point F, but this is not a limitation. For example, it is also possible to set the intersection between the first guide surface 153B of the first base 153 and the sensor central axis 15C as the focal point F, and it is also possible to perform the beam focusing setting the focal point F at a position distant from the first aperture part 153A such as the conveying surface 130.

Further, it is also possible to adopt a configuration of performing feedback control to adjust the delay time $\tau_i$ when performing the beam focusing based on the signal intensity of the reception signal output from the reception section 152. Specifically, the delay time $\tau_i$ when driving each of the transmission columns 23A (or the transmission elements 23) is changed with reference to the signal intensity of the reception signal to search for the focal point F at which the signal intensity of the reception signal is maximized. In this case, even in the case in which a misalignment has occurred in the relative positions between the transmission section 151 (155), the reception section 152, the first aperture part 153A and the second aperture part 154A in the case in which, for example, the ultrasonic sensor 15, 15A is attached to the image scanner 10, it is possible to search for the optimum focal point F, and thus, it is possible to suppress the deterioration of the overlap feed detection accuracy due to the attachment error.

Modified Example 6

In the first embodiment and the second embodiment, there is described the example in which the transmission section 151 (155) is disposed on the top surface side (the upper side in FIG. 2) of the main body 11 from the conveying surface 130, and the reception section 152 is disposed on the bottom surface side (the lower side in FIG. 2) of the main body 11 from the conveying surface 130, but it is also possible to dispose the transmission section 151 on the bottom surface side, and dispose the reception section 152 on the top surface side. In this case, it is possible for the conveying surface 130 to be coplanar with the first guide surface 153B of the first base. The first aperture part 153A is smaller in aperture area than the second aperture part 154A, and can therefore more effectively suppress the catch of the form P.

In contrast, in the case in which the reception section 152 and the second base 154 are separated from the form P, it is necessary to increase the reception area of the reception surface 152F and the aperture area of the second aperture part 154A. Therefore, even in the case of disposing the transmission section 151 on the bottom surface side of the main body 11, it is possible to dispose the conveying surface 130 in the vicinity (e.g., the second guide surface 154B) of the second base 154. In this case, since the aperture area of the second aperture part 154A can be made as small as possible similarly to the embodiments described above, it is also possible to suppress the catch of the form P by the second aperture part 154A.

Modified Example 7

The conveying path (the conveying surface 130) on which the form P is conveyed is not limited to the second guide surface 154B of the second base 154. For example, it is also possible that a spacer or the like is disposed with respect to the second guide surface 154B, and the position of the conveying surface 130 is defined by the spacer. In this case, since the conveying surface 130 is set at a position distant from the second guide surface 154B as much as the height of the spacer, the second aperture part 154A is formed to have a larger aperture area accordingly.

Modified Example 8

In the first embodiment, the image scanner 10 is illustrated as an example of the electronic apparatus according to the present disclosure, but this is not a limitation. For example, it is also possible to apply the ultrasonic sensor 15 according to the present disclosure when detecting the overlap feed of print paper in a printing device (a printer) provided with a print head for printing an image to the print paper conveyed on the conveying surface 130.

Further, it is also possible to use the ultrasonic sensor 15 according to the present disclosure in the case of determining the type of the print paper in such a printing device. Specifically, the printing device stores table data associating the signal intensity of the reception signal from the reception section 152 and the type of the print paper with each other in a storage section for storing such data in advance. Then, the control section (a computer) provided to the printing device functions as the state detection section according to the present disclosure to determine the type of the print paper corresponding to the reception signal from the reception section 152 with reference to the table data. In this case, it is possible for the printing device to form an optimum image corresponding to the type of the print paper on the print paper.

Further, the object is not limited to the form P or the print paper, but can also be a film, cloth and so on as described above.

Further, it is also possible to apply the ultrasonic sensor according to the present disclosure in a flow rate detection device for detecting the flow rate of a fluid flowing through a pipe or the like. Specifically, in the case of transmitting an ultrasonic wave to the fluid as the object, and then receiving the ultrasonic wave passing through the fluid, the proceeding direction of the ultrasonic wave varies in accordance with the flow rate of the fluid. On this occasion, by detecting the variation of the voltage value of the reception signal, it becomes possible to measure the flow rate of the fluid. In such a flow rate detection device, since the flow rate of the fluid is measured from the voltage variation of the reception signal, it is necessary to accurately train the sound axis of the ultrasonic wave transmitted from the transmission section on the reception section, and then set the reference position. By using the ultrasonic sensor according to the present disclosure, it is possible to accurately set the reference position, and thus, it is possible to improve the flow rate detection accuracy in the flow rate detection device.

Besides the above, specific structures to be adopted when implementing the present disclosure can be configured by arbitrarily combining the embodiments and the modified examples described above with each other, or can arbitrarily be replaced with other structures and so on within the range in which the advantages of the present disclosure can be achieved.

What is claimed is:

1. An ultrasonic sensor comprising:
    a first base opposed to a conveying surface on which an object is conveyed;
    a transmission section disposed on a first axis tilted with respect to the conveying surface, and at a side opposite to the first base to the conveying surface, and configured to transmit an ultrasonic wave toward the first axis; and
    a reception section disposed on the first axis, and at a side opposite to the conveying surface to the transmission section, and configured to receive the ultrasonic wave, wherein
    the transmission section is provided with a plurality of transmission elements each configured to transmit the ultrasonic wave arranged along a direction crossing the first axis,
    the first base is provided with a first aperture part through which the ultrasonic wave transmitted from the transmission section along the first axis passes, an aperture area of the first aperture part being smaller than an area of a transmission surface configured to transmit the ultrasonic wave of the transmission section, and
    the transmission section performs delayed drive on the plurality of transmission elements to thereby converge the ultrasonic wave transmitted from the transmission section toward the first aperture part.

2. The ultrasonic sensor according to claim 1, wherein the transmission section converges the ultrasonic wave on a center of the first aperture part as a focal point.

3. The ultrasonic sensor according to claim 1, wherein the conveying surface is located within a focal depth of a beam of the ultrasonic wave transmitted from the transmission section.

4. The ultrasonic sensor according to claim 1, further comprising:
    a second base disposed between the reception section and the conveying surface, and opposed to the conveying surface, wherein
    the second base is provided with a second aperture part through which the ultrasonic wave transmitted through the object along the first axis passes, an aperture area of the second aperture part being smaller than an area of a reception surface configured to receive the ultrasonic wave of the reception section.

5. The ultrasonic sensor according to claim 4, wherein the aperture area of the second aperture part is larger than the aperture area of the first aperture part.

6. The ultrasonic sensor according to claim 4, wherein the conveying surface is a surface of the second base, the surface being opposed to the first base.

7. An electronic apparatus comprising:
    the ultrasonic sensor according to claim 1; and
    a state detection section configured to detect a state of the object in accordance with an output from the reception section of the ultrasonic sensor.

* * * * *